United States Patent
Thygeson et al.

(10) Patent No.: US 6,961,418 B1
(45) Date of Patent: Nov. 1, 2005

(54) TELEPHONE APPOINTMENT PROCESSING SYSTEM

(75) Inventors: Nels M. Thygeson, Minneapolis, MN (US); Marc Fountain, Point Richmond, CA (US)

(73) Assignee: Mediphonics, Inc., Emeryville, CA (US)

(*) Notice: Subject to any disclaimer, the term of this patent is extended or adjusted under 35 U.S.C. 154(b) by 379 days.

(21) Appl. No.: 10/315,439

(22) Filed: Dec. 9, 2002

(51) Int. Cl.[7] .......... H04M 3/42; H04M 3/00; H04M 5/00

(52) U.S. Cl. .......... 379/210.01; 379/265.04; 379/266.07

(58) Field of Search .......... 379/210.01, 202.01, 379/265.02, 211.01, 211.02, 201.01, 201.02, 379/207.04, 265.04, 265.05, 266.07

(56) References Cited

U.S. PATENT DOCUMENTS

| | | | | |
|---|---|---|---|---|
| 5,815,566 A | * | 9/1998 | Ramot et al. | 379/210.01 |
| 5,848,132 A | * | 12/1998 | Morley et al. | 379/210.01 |
| 5,909,487 A | * | 6/1999 | Mainker | 379/209.01 |
| 5,982,863 A | * | 11/1999 | Smiley et al. | 379/88.18 |
| 6,430,281 B1 | * | 8/2002 | Morley et al. | 379/210.01 |
| 2003/0063732 A1 | * | 4/2003 | Mcknight et al. | 379/210.01 |
| 2003/0135397 A1 | * | 7/2003 | Halow et al. | 705/4 |
| 2003/0206619 A1 | * | 11/2003 | Curbow et al. | 379/210.01 |

* cited by examiner

Primary Examiner—Benny Q. Tieu
(74) Attorney, Agent, or Firm—Reed Smith LLP; John W. Carpenter

(57) ABSTRACT

Appointments for a professional are captured and placed on an "electronic" waiting list (e.g., database of scheduled appointments) in an appointment system. When available, the professional (e.g., a physician) communicates with the appointment system and announces his availability. The appointment system begins contacting individuals (e.g., patients) on the waiting list (e.g., in an order specified by the professional), and then bridges the physician and patient for the appointment. The communications are preferably telephone calls, but may be telephone, electronic chats, e-mail, pages, etc. The appointment system includes a billing interface that charges the patient/patients insurance for the appointment. The Appointments themselves may be scheduled, for example, via a touch tone phone response system, a web interface, or other communication devices, etc.

36 Claims, 20 Drawing Sheets

Fig. 13

TELEPHONE APPOINTMENT PROCESSING SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to telecommunications systems, and amongst other things to a method of dynamically scheduling multiple events in a telecommunications system with asymmetric demand. The invention is yet further related to the scheduling and completion of appointments.

2. Discussion of Background

There are approximately 650,000 physicians in the United States spending an average of one hour per day on the phone with patients. This time is typically unscheduled, disruptive to other work, and almost always uncompensated. Neither physician nor patient is satisfied for numerous reasons, all resolved by the invention. The invention facilitates and documents scheduled medical telephone appointments and collects payment for the physician, enabling physicians to efficiently serve patients telephonically, when medically appropriate, thereby enhancing physician revenue and patient satisfaction.

Medical telephone services are fragmented and in disarray. Telephone medicine has become a major way that physicians provide care, but it remains informal, unstructured, and uncompensated. In its current form, telephone medicine substantially adds to the stress and dissatisfaction of physicians and patients, alike. Physicians are unhappy because it provides no revenue, has grown to a significant percentage of the work they do, and is disruptive. Patients, while they like the convenience of being able to talk to their doctor by phone, are unhappy with telephone medicine as currently practiced because it is unscheduled, and they generally spend a lot of time either playing phone tag with their physician, or waiting by the phone for a call back. The current arrangement results in delayed care, mutual frustration, and considerable administrative costs associated with managing the multiple missed calls.

Some patients have grown accustomed to accessing their physician by telephone, regardless of time of day or urgency of need, and without additional cost. In an effort to reduce the stress generated by these existing disruptive calls and driven by the desire to be compensated for the time spent consulting patients, some physicians are employing a policy of not seeing patients—either in the office or on the phone—without a scheduled appointment.

A physician must treat all patient calls as necessary, yet the necessity is often determined by the patient with no financial obligation for the physicians' telephone time. As a result, unwarranted calls are made, and expected to be either accepted or returned within a reasonable time. The lost revenue and disruption to the physicians practice create an atmosphere of being rushed and a feeling of resentment.

When patients have their very first office visit with a physician, they feel the entitlement of access to that physician, as if the $65 office visit was the price of a retainer. The process of changing the behavior of patients, especially those that abuse the willingness of a physician to return calls, has met with resistance from patients and office staff alike.

SUMMARY OF THE INVENTION

The present inventors have realized the need for an automated system that facilitates documenting a physician call and collecting the physician's fee for the call from the patient. Such a system would relieve an already overburdened staff, decrease physician operating costs and generate additional revenue.

Currently, there is no technology available that would automate this process without significant human intervention. In the absence of the invention, attempts to provide scheduled telephone appointments using either the physician office staff or a traditional telephone answering service would be labor intensive and cost prohibitive.

The invention is a fully automated system that facilitates physician/patient phone appointments, and handles billing, collection, and payment tasks efficiently and cost effectively utilizing telecommunication and Internet technology.

While there has been a lot of press and market interest in physician-patient secure electronic messaging ("e-mail"), this communication channel has not achieved meaningful market penetration because it requires the adoption of technology that is not currently part of standard medical practice or business processes. Although usable with the present invention, the present invention preferably uses a communication channel already used everyday by both physician and patient (the telephone), combined with new business processes and software. The Invention provides a method of replacing chaos, resentment and uncertainty with value and satisfaction for all participants. The number of unnecessary calls will decrease, since patients will be expected to pay for these "visits", and the remaining calls will be of shorter duration and of higher quality.

The invention is a computerized telecommunications system and business process allowing for scheduled, compensated medical telephone appointments. The invention combines a database with a telephonic interface to connect patients and physicians at mutually convenient times and provide compensation to the physician. The invention automatically reconciles the inherent tension between a physician's busy schedule and a patient's expectation of prompt service. The invention accomplishes this by providing a scheduled appointment time to the patient (freeing them to do other things prior to the appointment time) but then providing the physician with control of the precise timing of the call at or near the appointment time. When the physician is ready to service phone appointments, the system automatically manages a queue of patients who have scheduled appointments proximate in time. The scheduling, queuing, telephone appointment, reporting, billing and collection functions are handled by the system for the physician with no equipment located in the physician's office. Normally, a physician will have multiple unpaid, unscheduled telephonic interactions in a typical day. The invention has the potential to transform physician phone time from a disruptive revenue sink to an organized revenue source with improved patient satisfaction.

In one embodiment, the present invention provides an appointment processing system, comprising, a scheduling device configured to save appointment times from users contacting the scheduling device, a communications server configured to receive an incoming communications from a professional, and establish outgoing communications to at least one user on the waiting list and place each established outgoing communication on hold, and a bridging mechanism configured to bridge the professional to at least one of the users on hold.

The present invention includes a method comprising the steps of, assigning at least one user on a waiting list for an appointment with a professional, establishing a communications with the professional, establishing a communications with at least one of the users that have assigned appointments, and bridging the communications with the professional to the communications with the communication with said at least one user to commence the user's appointment.

Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire (s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 13 is a graphic representation of a screen used in carrying out a Physician Accounts Management function of database administration according to various embodiments of the invention;

DESCRIPTION OF THE PREFERRED EMBODIMENTS

Figure 1A:
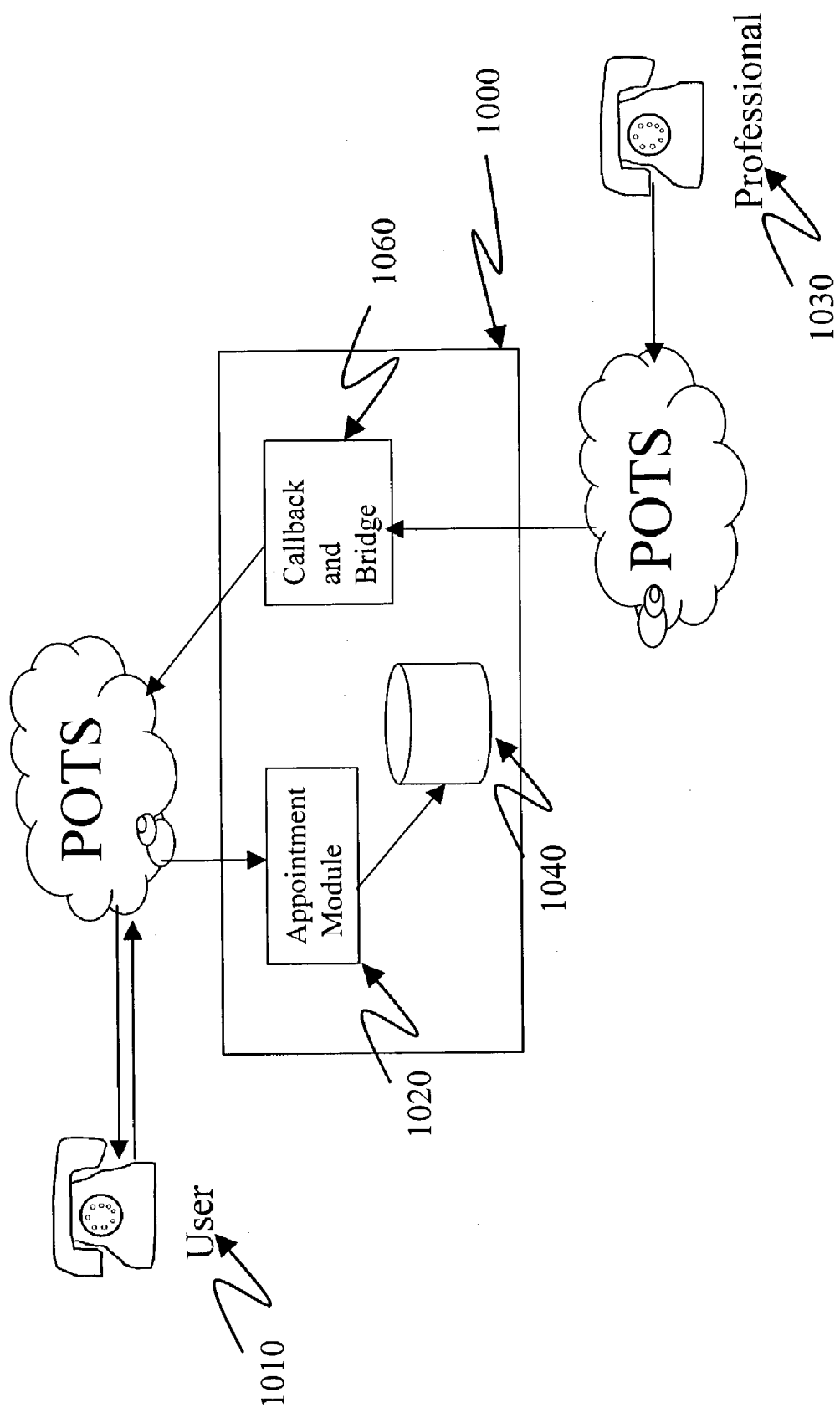
FIG. 1A is a block diagram of components according to an embodiment of the present invention.

The present invention provides a convenient way for professionals (or other high time demand individuals) to schedule and provide telephone (or other communications medium) consultations with clients or other practitioners. Referring now to the drawings, wherein like reference numerals designate identical or corresponding parts, and more particularly to FIG. 1A thereof, there is illustrated a high level block diagram of an embodiment of the present invention. The invention is an appointment system 1000 that includes an appointment module 1020 for making appointments. The appointment module 1020 includes capabilities to present various menus (e.g., voice menus) or other prompts for information to a user, and retrieve responses (e.g., telephone keypad, voice response, or other input mechanisms that allow a caller to respond to the menus/prompts). The menus/prompts and responses are provided to facilitate one or more "appointment setting" paradigms. In one embodiment, the appointment module also includes facilities for tracking information about completed appointments (e.g., time and length of appointment, data regarding appointment, etc.). A storage device (e.g., database) 1040 is configured to maintain records of scheduled appointments and, if applicable, completed appointments. A callback/bridging device 1060 is configured to call back users 1010 for scheduled appointments and bridge the callbacks to a professional 1030 on another line.

The appointment system itself may be packaged in a computer system local to the professionals office, or maintained offsite. The system may service a physicians office, a suite of physicians, or any number of physicians registered with the appointment system (e.g., an offsite system that registers plural physicians, setting and servicing appointments from each physicians' patients).

Figure 1B:
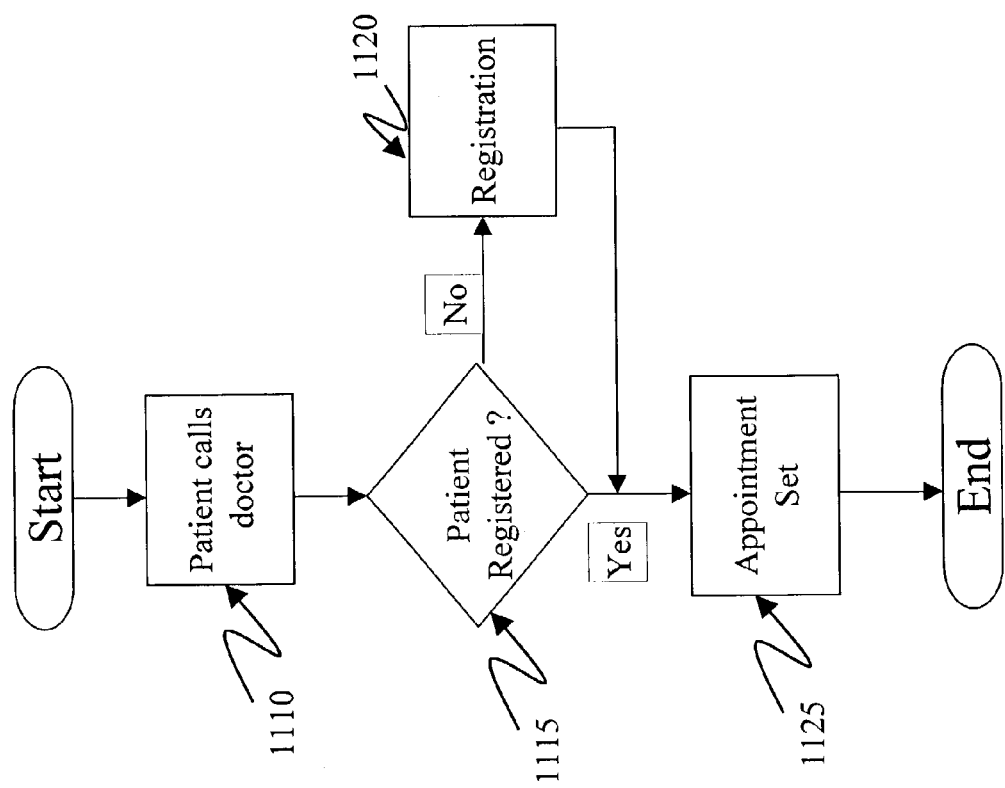
FIG. 1B is a flow chart of an appointment registration method according to an embodiment of the present invention.

FIG. 1B is a flow chart of an embodiment of a method performed by the present invention that illustrates a process of registering a user (a patient in this example) for an appointment with a professional (a doctor in this example).

At step 1110, the patient calls the doctor's appointment system to arrange a telephone appointment. In one embodiment, the patient is given free access to the appointment system (e.g., the patient is not limited as to when or how many times the patient can call in and schedule a telephone appointments). In another embodiment, the patient first calls the doctors office, where the doctor's staff provide the patient with access codes or other information needed to register for a phone appointment. Other forms of providing access to the appointment system may be utilized (e.g., a patient may be given a book of appointment codes that may be used to schedule appointments, etc). Preferably, the physician maintains regular hours for phone appoints (e.g., 4:30–5:30 PM on weekdays).

When the patient accesses the telephone system (step 1115), the patient is identified according to registration records maintained by the appointment system. If the patient is not registered with the appointment system, the patient responds to prompts to register with the appointment system (step 1120). Registration information includes, for example, the patients name, id number (e.g., social security number), payment method (e.g., insurance information, doctor id, etc.

After registration or identification, the patient responds to prompts to schedule an appointment (step 1125). Although the patient may schedule the telephone appointment using the telephone, a web based interface is envisioned that will allow patients to register and schedule appointments over various types of internet or other network connections (e.g., web browser, wireless internet, phone based internet surfing, etc.). The prompts elicit data from the patient, such as doctor id, time slot for the appointment, and/or any other relevant data needed by the appointment system. The scheduled appointments are preferably made during the doctors regularly scheduled telephone appointment hours, and the appointment module 1020 is configured such that appointments are only made during regular telephone appointment hours.

In one embodiment, the appointment system is configured to make conference call type appointments that connect the physician simultaneously to two people (e.g., patient and family member; patient and another care provider; etc.). The storage device 1040 is a database that stores multiple contact numbers for the appointment (provided either during registration 1120, or appointment setting 1125).

Preferably, the physician makes a commitment to maintain certain hours, in effect guaranteeing the patient a call back within a predetermined grace period (amount of time +/−from the scheduled appointment). In one embodiment, a feature advantage for a scheduled telephone appointment is that the physician calls the patient within the grace period of a scheduled appointment or else there is no charge (or a discount) for the appointment. The appointment system is preferably configured to allow the physician to be able to customize their commitment (i.e. pick their grace period, e.g., 15 minutes, one hour, etc.). The guaranteed call back within the grace period is considered by the inventors to be a highly effective customer relations feature, in essence giving the patient guaranteed attention of the physician which justifies some of the additional charges that may be incurred by using the appointment system.

In one embodiment, the appointment system includes a billing charge lock out (e.g., if the physician call back takes place outside the grace period set by the physician, the physician is prevented from submitting a charge (s/he can enter medical data, but the charge is set to $0)). In this embodiment, if the physician wants to turn off the lock out imposing the $0 charge, s/he can set the grace period to a very large number of minutes (alternatively a physician menu includes a "turn off the lock out" feature that allows the physician to disable lock-outs).

Other arrangements for telephone appointments may be made. For example, the appointment system is configurable such that is the physician prefers to have the option of calling back during non regular hours, the patient may, instead of selecting a time slot for an appointment, select to be placed on a waiting list for the soonest available callback. In another example, emergency after hours calls may be handled by the appointment system on a case by case basis (note example discussion further below).

Figure 1C:
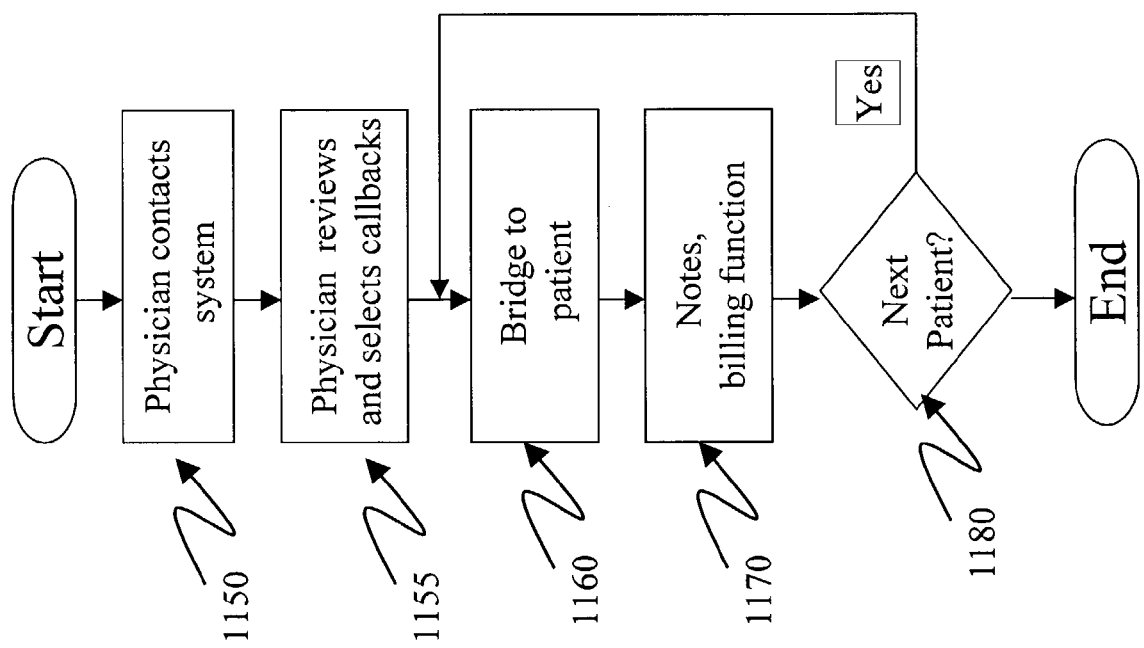
FIG. 1C is a flow chart of an appointment completion process according to an embodiment of the present invention.

FIG. 1C is a flow chart of an embodiment of an appointment completion process according to the present invention. At step 1150, a physician contacts the appointment system 1000 preferably during regular telephone appointment hours. The appointment system provides the physician with a list of appointments, including information such as patient name, nature of the appointment etc. The appointment information provided to the physician may be provided via a telephone voice from the callback or appointment module 1020 via a telephone line connection with the physician, or the appointment information may be provided via a web interface. After reviewing the appointment information, the physician selects a first patient for a call back. The selection may be made via telephone keypad, voice response, and or internet, network, or local computer based commands forward to the appointment system. The callback system then makes a communication with the first patient by, for example, dialing the first patients telephone number. When the first patient is contacted, the first patient is bridged to the physician (step 1160), and the telephone appointment proceeds with a discussion between the physician and first patient.

In the conference calling embodiment discussed above, callbacks are performed to all numbers listed for callback, and the physician is bridged to the multiple callbacks simultaneously. In one embodiment, the physician is provided the additional callback numbers and manually activates the conference calling feature.

As much information as possible is automatically tabulated by the appointment system (e.g., name of patient, duration of call, etc.). After completing the telephone appointment, the appointment system prompts the physician for notes, treatment/diagnostic codes, billing codes, or other information needed to document the completed appointment (step 1170). All available information about the appointment is stored as a record documenting the completed appointment.

In one embodiment, ICD9 codes are used for a diagnosis code that is entered by the physician into the appointment system after an appointment is completed. Preferably, the physician enters the ICD9 code using a series of touch tones generated from the telephone keypad. The appointment system includes software that automatically parses a series of touch tones into a valid, appropriately punctuated, accurate ICD9 codes. The present invention includes a look up table that translates an abbreviated ICD9 code into its full value. In one embodiment, a voice input system is utilized to capture the input codes (abbreviated or full codes). The present invention also includes shortcut procedures for entering ICD9 or other codes, including, for example, pressing # for the most common code, * for the last entered code, etc.

At step 1180, a next patient is contacted (e.g., telephone call), and the process of bridging, conducting the appointment, and collecting notes and billing codes is repeated for the next patient. In one embodiment, the next patient is contacted at a predetermined point in the process before the physician completes step 1170 for the previous patient. For example, the next patient may be contacted as soon as the physician starts step 1170. In this example, the next patient is temporarily placed on hold while the physician completes step 1170.

In one embodiment, if the patient is not available or otherwise unreachable (e.g., because the member is not at the number called, or because the answering machine picks up instead, or because they have a phone that 1) they can't stay off of (work phone/receptionist, etc.), and 2) incoming calls when the line is busy roll over automatically to voice mail), the physician is notified and the appointment system attempts to contact the next patient. In one embodiment, if attempts to contact the patient are met with a voicemail system, a message is automatically relayed to the voicemail system explaining that the physician has tried to contact the patient. The voicemail message may include a description of the patient's various options for reconnecting with the physician. In one embodiment, the unavailable patient is left a voicemail instructing the patient to call back the appointment system and re-schedule the appointment, or wait for a second callback attempt (which occurs, for example, after a time delay or after a next patient's appointment is completed).

In another embodiment, the unavailable patient is left a voicemail providing a call back number for the patient to call to be placed on hold in a "waiting room," to be connected with the physician as soon as s/he becomes available. In this embodiment, if the physician has completed his telephone appointments for the day by the time the previously unavailable patient calls back, then the physician is paged (e.g., see after hours paging process, FIG. 8). Alternatively, the patient is notified that the physician is now unavailable and redirected to the appointment system to re-schedule.

The appointment system may be configured, for example, to automatically bill the unavailable patient (no-show fee/default charges), or attempt to contact the unavailable patient in a subsequent time slot. A cancellation window (e.g., 24 hours, 8 hours, etc) may be implemented by the appointment system such that if a patient cancels within the window, the no-show fee applies. The no-show fee and cancellation window are preferably selectable (amount of no-show fee, and size of the cancellation window) and applied on an individual basis for each physician using the appointment system.

A significant aspect of the present invention is a system and a process that allows a professional or other 'in-demand' person (e.g. a physician) to improve the efficiency of processing requests from 'demanding' persons (e.g. patients). The present invention allows the professional (or 'in-demand' person) to "time shift" telephone calls from a pre-scheduled specific time to a time more convenient for the 'in-demand' person, (e.g. ' 12 minutes after the scheduled time', or '6 minutes before the scheduled time'). In addition, calls that would normally require attention at odd hours during the workday, are grouped together at a scheduled time for telephone appointments. The efficiency is accomplished by allowing the physician to reject interruptions and control the timing of telephone contacts through the following steps: a) accepting a scheduled appointment for a specified time in the future, b) retaining control of the actual appointment time by indicating 'ready to process' (to a system) at some time proximate but not necessarily equal to the specified appointment time, c) managing the connection to patient, billing and medical record-keeping through said system using automated processes.

Figure 1D:
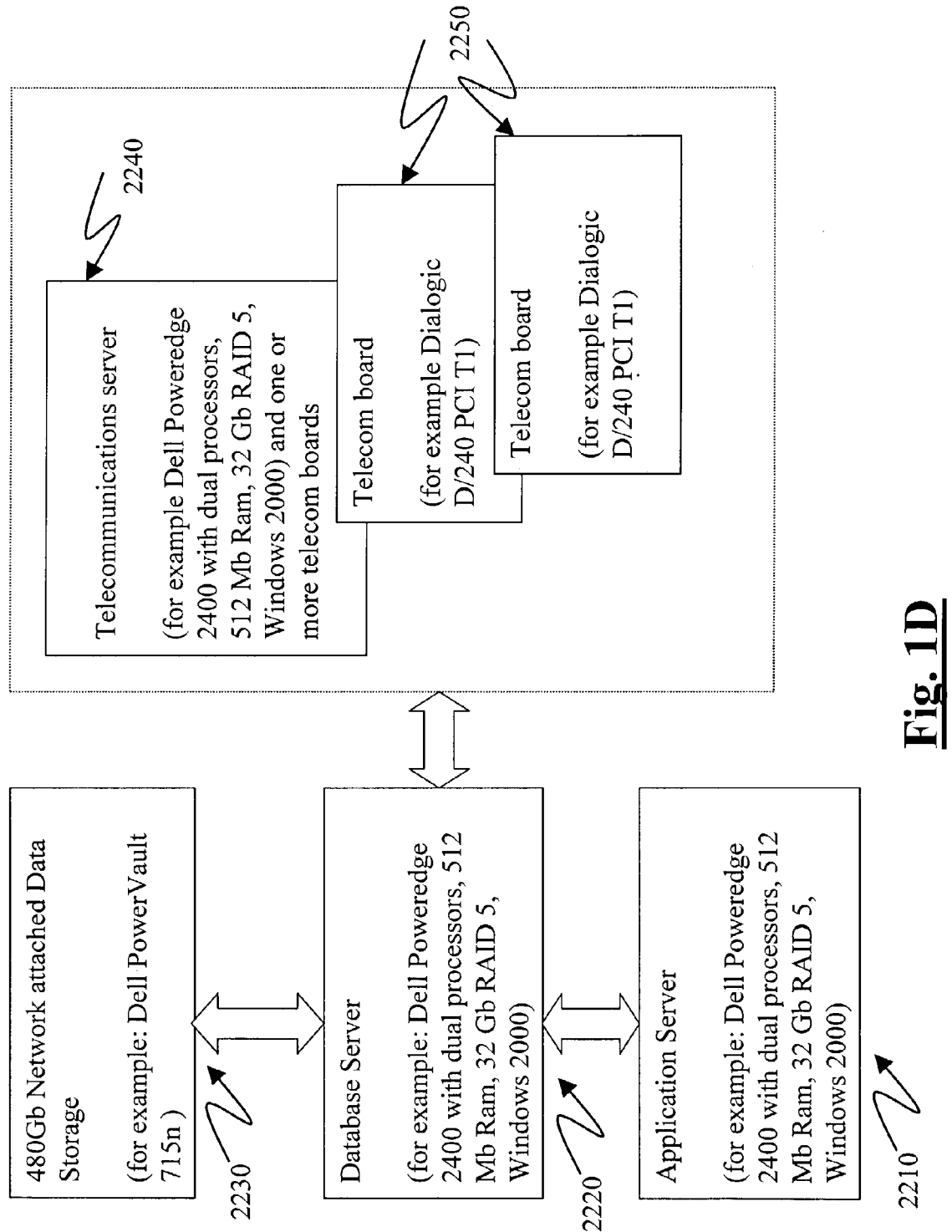
FIG. 1D is a diagram showing example hardware components used for database and application processing tasks according to an embodiment of the present invention.

FIG. 1D is a diagram showing detailed examples of hardware components that may be used for database and application processing tasks according to an embodiment of the present invention. One or more application servers 2210, which, from a hardware perspective, can be, for example, industry standard Intel processor based computers with dual Pentium processors, 512 Mb Ram, 32 Gb RAID 5, Windows 2000 (e.g. Dell PowerEdge 2400). One or more database servers 2220, also from a hardware perspective, can be, for example, industry standard Intel processor based computers with dual Pentium processors, 512 Mb Ram, 32 Gb RAID 5, Windows 2000 (e.g. Dell PowerEdge 2400). One or more network attached data storage devices 2230, again, from a hardware perspective, can be, for example, industry standard arrays of redundant disk drives with a dedicated network interface e.g. (Dell PowerVault 715n). One or more telecommunications servers 2240, from a hardware perspective, can be, for example, industry standard Intel processor based computers with dual Pentium processors, 512 Mb Ram, 32 Gb RAID 5, Windows 2000 (e.g. Dell PowerEdge 2400) containing one or more telecommunications boards 2250 that electronically interface with public or private telecommunication systems (e.g. Dialogic D/41 EPCI for analog connections or Dialogic D/240 PCI T1 for digital connections). In one embodiment, the application server telecommunications server, and database server are located on a single computer.

Software according to the present invention hosted on any one or more of the servers interacts with the telecommunications board(s) (e.g., Dialogic D/240) and attached storage devices to implement the various processes and features of the present invention. For example, the Dialogic board includes an Application Programming Interface (API) that allows software programs to interact with the board (e.g., instructing the board to answer calls, make calls, bridge individual calls or communications together, etc). The programs are written, for example, in a telecommunications programming language compatible with the API. Commercially available development environments may utilized, including APEX OmniVox which provides a graphical user interface in which a programmer selects certain actions (e.g., make calls, bridge calls, etc.) and outputs a program compatible with the Dialogic board. Other telecommunications equipment may be utilized.

In addition, software implementing the various graphical user interfaces (GUIs, and/or equivalent screens) discussed herein interacts with the database server to perform database administration tasks that include maintaining records of professionals, users, appointments, billing, etc. as also discussed herein.

Figure 1E:
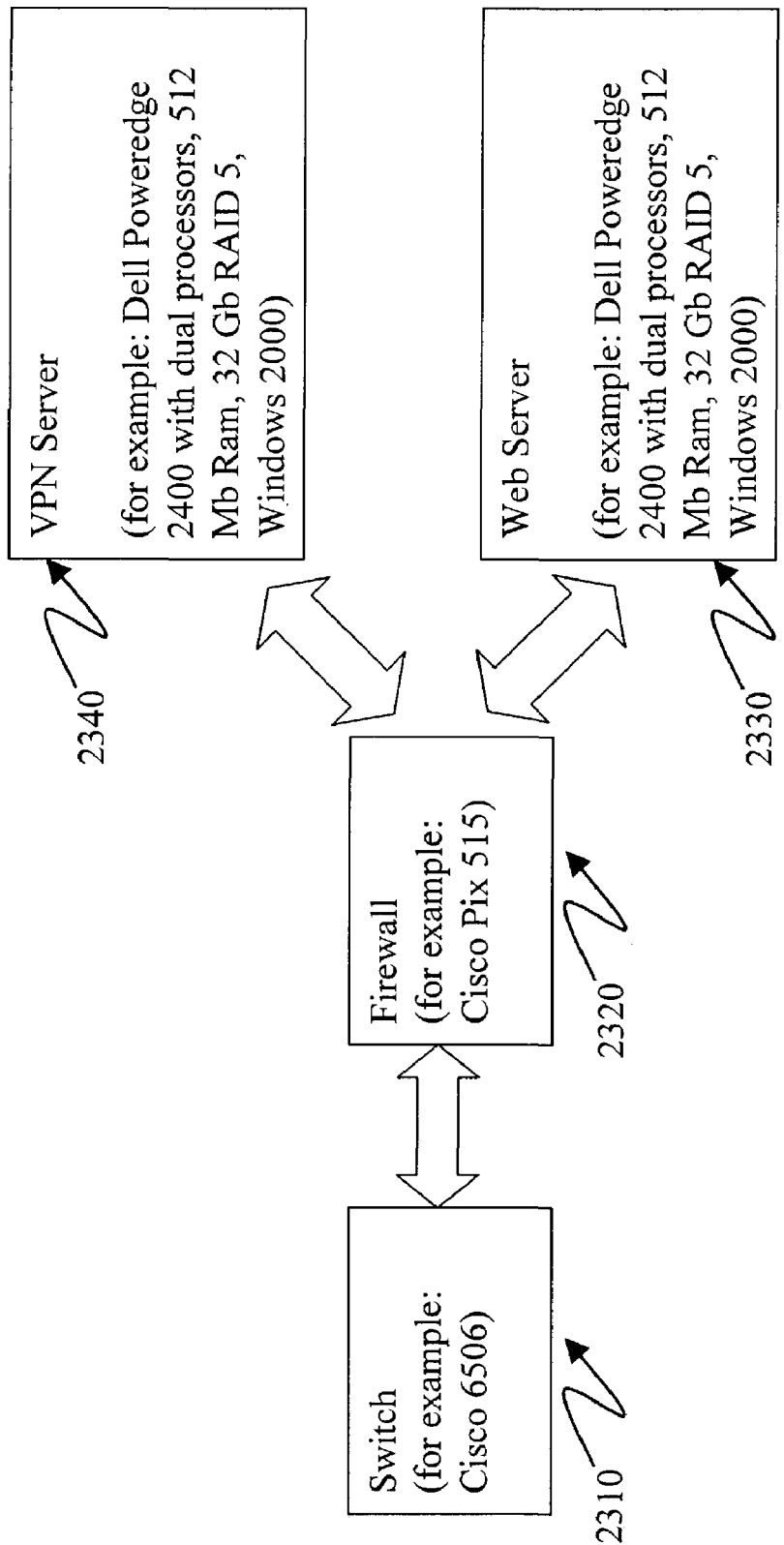
FIG. 1E is a diagram showing example hardware components used for telecommunications, security and switching tasks according to an embodiment of the present invention.

FIG. 1E is a diagram showing detailed examples of hardware components that may be used for telecommunications, security and switching tasks according to an embodiment of the present invention. One or more telecommunications switches 2310 can be, for example, industry standard switches (e.g. Cisco 6506). One or more firewalls 2320 can be industry standard firewalls (e.g. Cisco Pix 515). One or more Web servers 2330 can be, for example, industry standard Web servers; Intel processor based computers with dual Pentium processors, 512 Mb Ram, 32 Gb RAID 5, Windows 2000 e.g. Dell PowerEdge 2400). One or more VPN servers 2340 can be, for example, industry standard VPN servers; Intel processor based computers with dual Pentium processors, 512 Mb Ram, 32 Gb RAID 5, Windows 2000 e.g. Dell PowerEdge 2400).

As with all example hardware devices, configurations, and software processes discussed herein, each of the above are provided as an example that may be used to implement the present invention. Other devices, configurations, and software processes having equivalent functionality will be readily apparent to the ordinarily skilled artisan upon review of this disclosure.

Figure 2:
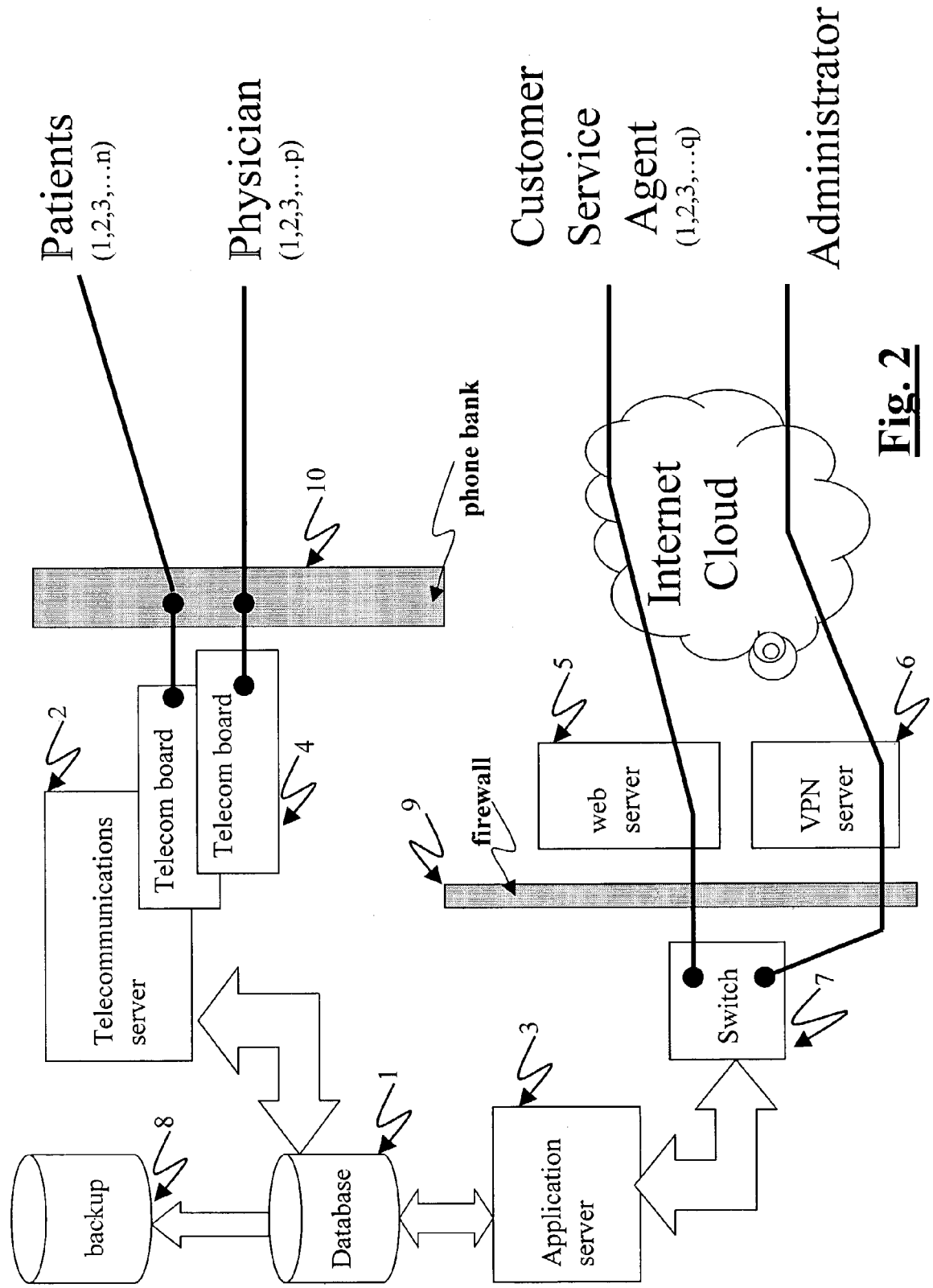
FIG. 2 illustrates an example computer and telecommunications network configuration applicable to an embodiment of the present invention.

To enable the timing-control functions, accept appointments, connect and meter calls, accept transaction specific data and perform accounting and billing, FIG. 2 illustrates a system configuration comprising a database 1 that holds physician records, patient records, scheduled future appointments, transaction records, billing/payment data.

Data in the database are added, modified, and/or deleted by the application server 3 and the telecommunication server 2. The application server adds, modifies, and/or deletes information in the database when a human customer service agent, administrator, or stored process places a request. The telecommunications server adds, modifies, and/or deletes information in the database when a request is placed from a process operating on a telecom board 4 connected to the phone bank 10.

A web server 5 delivers data add, modify, and/or delete requests to the application server through a firewall 9 and a router 7. A VPN server 6 provides secure access to the application server through the firewall and router for customer service agents and administrator. A backup system 8 ensures that the database can be restored in case of hardware failure.

Figure 3:
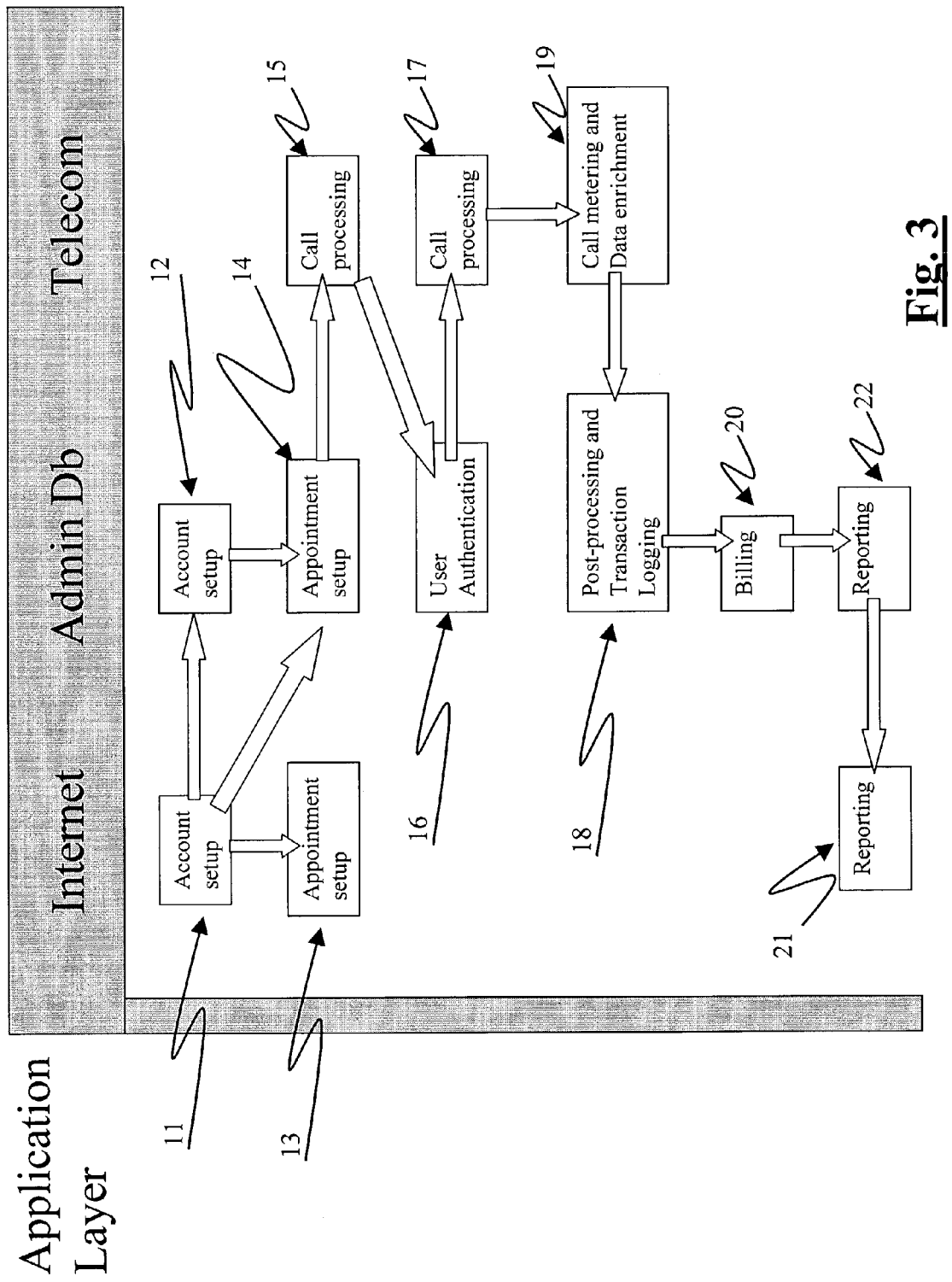
FIG. 3 shows example modules of software code, functions each module performs, and a sequence in which each module may be accessed.

An example of a process enabled by FIG. 2 is shown in FIG. 3. First, an account is created for each physician or patient user by the internet account setup module 11 or directly in the database by AdminDb account setup module 12. The information created in account setup is required for authentication, time synchronization, billing and reporting functions. Next, a scheduled telephone appointment is created by the internet appointment setup 13 and/or the AdminDb appointment setup 14. When an incoming call enters the phone bank 10, the call processing module 15 passes the call to the user authentication module 16 and then to an instance of call processing module 17—the specific instance depending on whether the caller is authenticated as a physician.

If the caller is authenticated as a physician then the call is processed by an instance of call processing module 17 and if the scheduled time for a phone appointment between that physician and a patient of that physician is proximate, then that patient is called on an outbound line and if the call is answered, the patient and physician are 'bridged' (connected together for two-way discussion without control of the call being surrendered by the connecting process) by module 17. After the bridge is in effect, the call is metered by the call-metering and data-enrichment module 19. When the bridge is terminated, module 19 queries the physician for medical data specific to the call—CPT (treatment) codes, ICD9 (diagnosis) codes, and a fee. After the data enrichment is complete, the call is post-processed by module 18 where the completed transaction is entered in the database 1. Billing, module 20 is a stored process that looks for billable transactions in the database and activates a billing event—through a credit card, automatic drafts from a checking account, paypal, or another electronic funds transaction.

Periodically, the reporting process 22, generates a report containing a transaction record for payers or physicians that will also be available/delivered through the internet reporting process 21.

Figure 4:
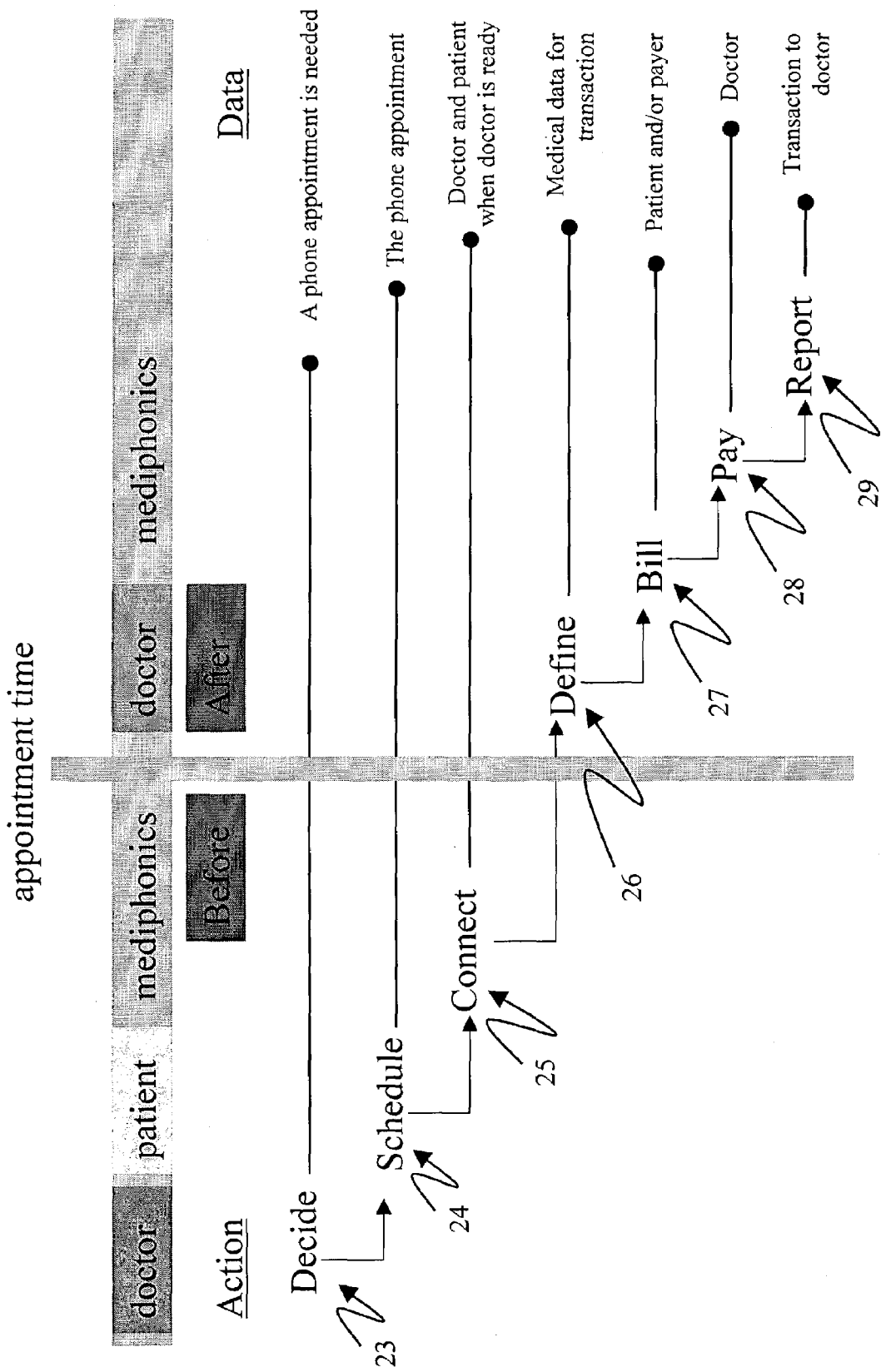
FIG. 4 is a block diagram showing an example of functions of an embodiment of the invention and a sequence in which they may be performed.

FIG. 4 delineates an example process flow for actions described in FIG. 3 for each party to the transaction. First the physician decides 23 a phone appointment is needed. Next the patient schedules 24 the phone appointment. The invention connects 25 the patient and physician together when they are both ready. After the phone appointment is complete, the physician defines 26 the medical data to be attached to the transaction. The invention bills (collects money) 27 from the patient or designated payer. The invention pays 28 the physician and reports 29 the details of the transaction to the physician and/or the payer.

Figure 5:
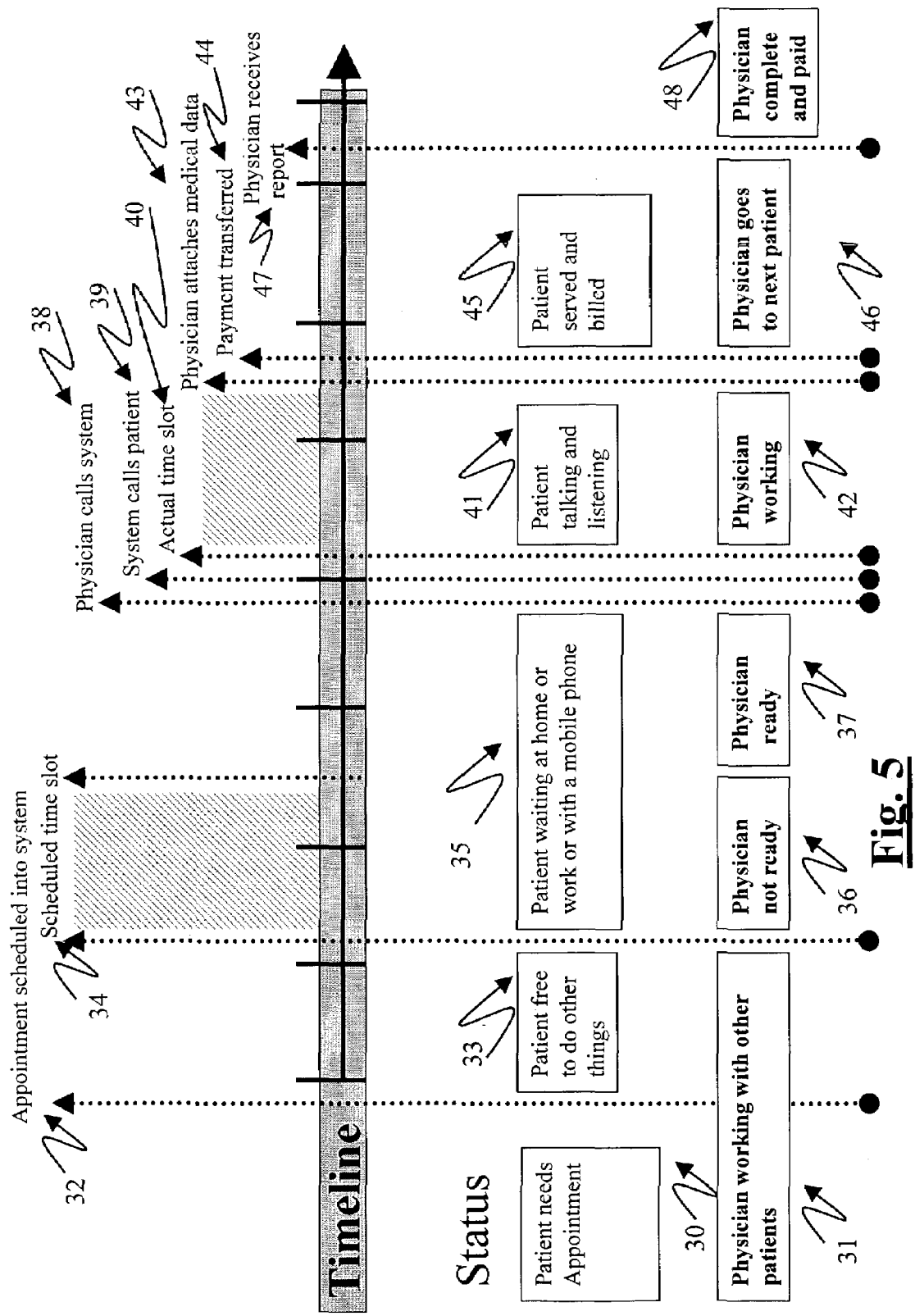
FIG. 5 is an example timeline showing status of each phone participant within a sequence of events occurring before, during and after a medical telephone appointment.

FIG. 5 presents the events of FIG. 4 in a timeline showing how the status of each party changes as events occur. The initial status of patient is "needs appointment" 30 and the physician's status is "working with other patients" 31. After the appointment is scheduled 32 into the system, the patients' status changes to is "free to do other things" 33. When the scheduled time slot arrives 34, the patients' status changes to "patient is waiting by a phone" 35 but the physicians status may not have changed will likely be "physician not ready" 36. When the physician's status changes to "physician ready" 37, the physician calls the invention 38. The invention determines which patient to call and calls that patient 39 and the actual time slot 40 begins. During the actual time slot, the status of the patient is "talking and listening" 41 and the status of the physician is "working" 42. When the actual time slot is over, the physician attaches medical data 43 and the invention bills patient and transfers payment to the physician 44. The status of the patient changes to "served and billed" 45 and the physician goes to the next patient 46. Later, the physician receives a report 47 and the physician's status changes to "complete and paid" 48.

Figure 6:
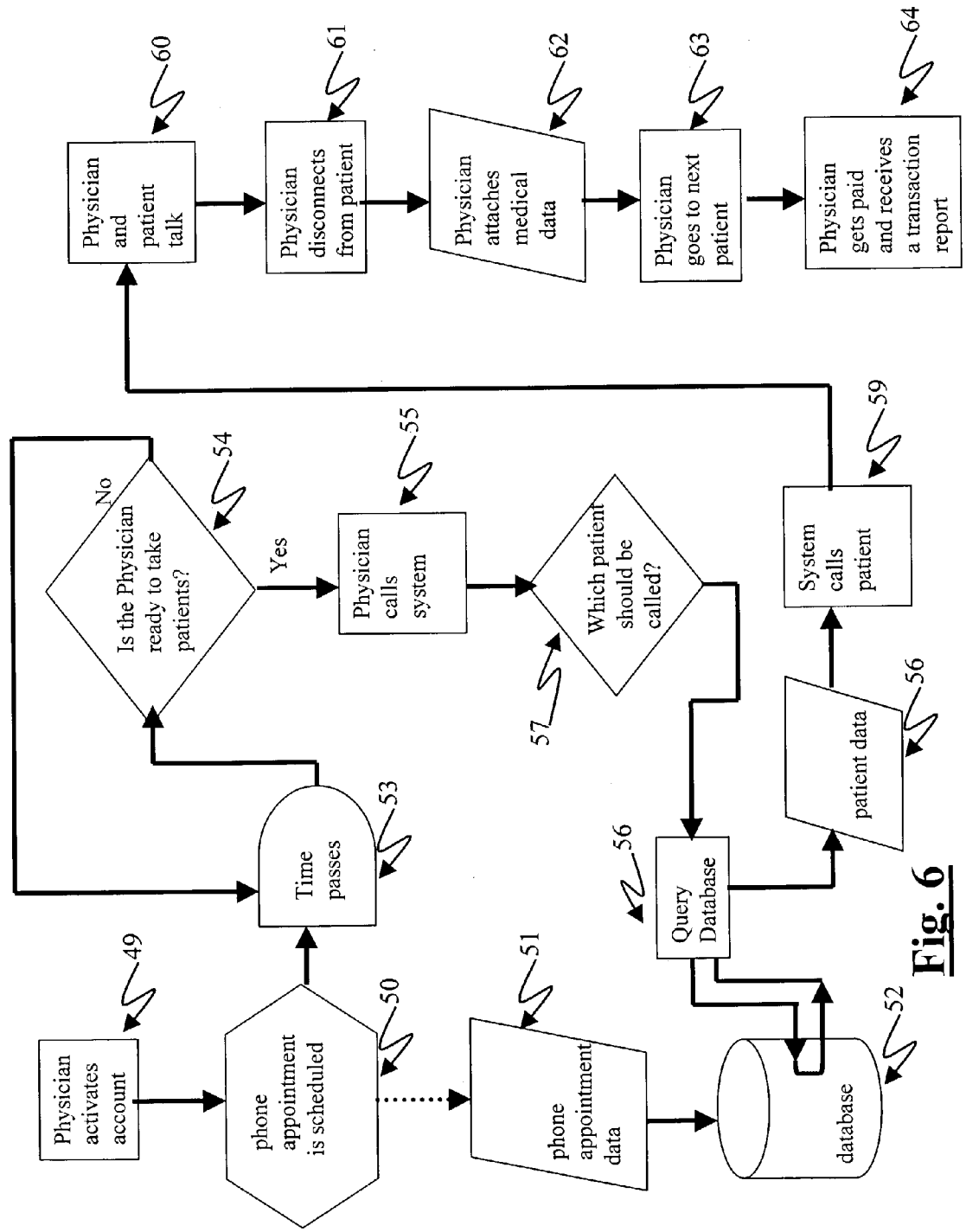
FIG. 6 is an example detailed flow chart showing the functions of an embodiment of the invention from the Physicians viewpoint in a follow-up visit embodiment.

FIG. 6 is a detailed flow chart of an example of a follow-up visit embodiment of the invention from the physician point-of-view. First the physician activates an account 49 (for database tracking and security purposes) in the invention. Next, one of the physicians patients schedules a phone appointment 50 and the data 51 is stored in the database 52. Time passes 53 while the system continually monitors inbound lines to determine if the physician is ready to take patients 54. When the physician calls the system and indicates that they are ready 55, the system builds a query 56 to determine which patient should be called 57 and retrieves that patients data 58. Next, the system calls the patient 59 and the physician and the patient talk 60 until the physician disconnects from the patient 61. The physician attaches medical data to the transaction 62 goes to the next patient 63 and later receives payment and a report 64.

Figure 7:
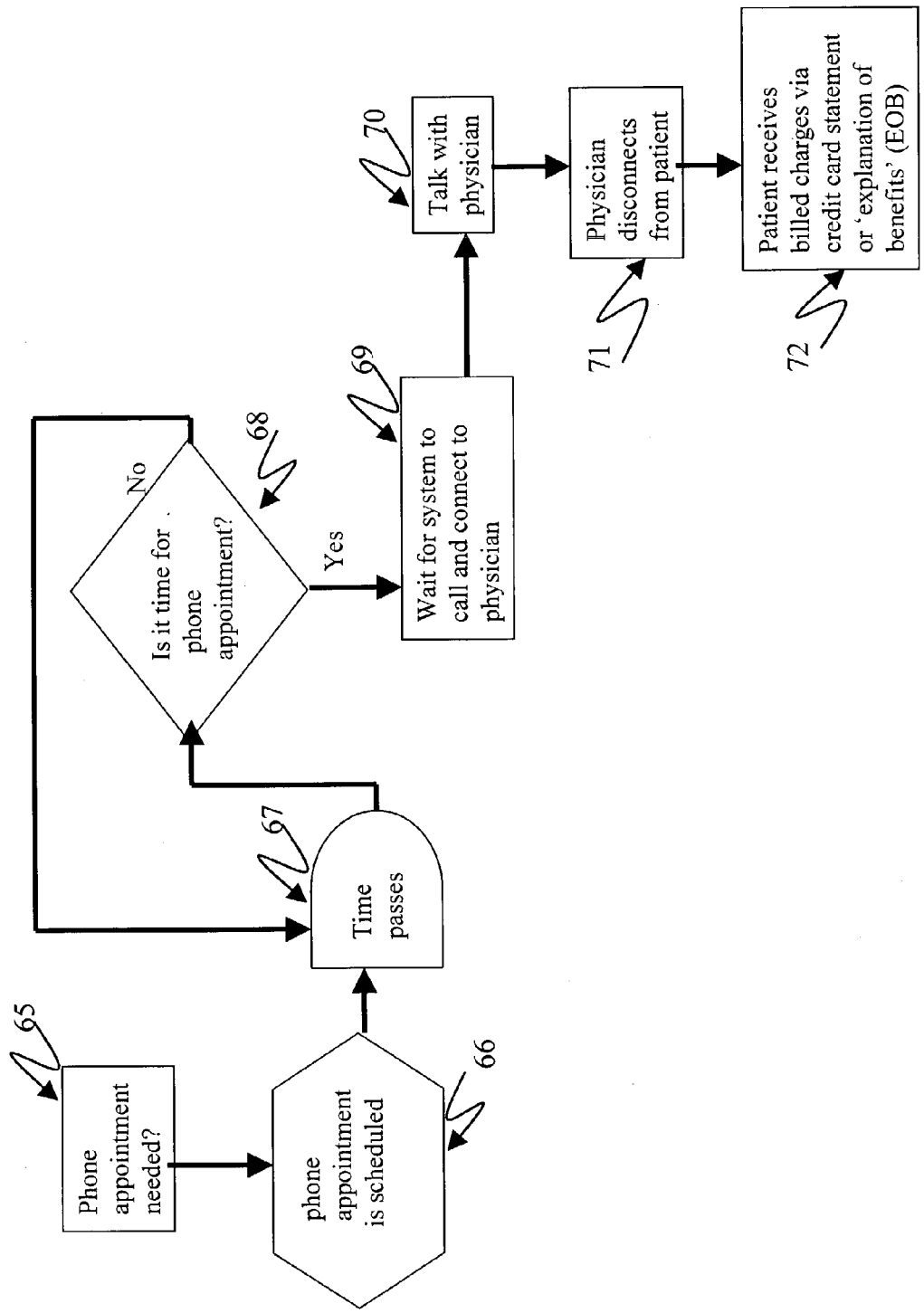
FIG. 7 is an example detailed flow chart showing the functions of an embodiment of the invention from the Patients viewpoint in the follow-up visit embodiment.

FIG. 7 is a detailed flow chart of an example of a follow-up visit embodiment of the invention from the patient point-of-view. First the patient (with their physician) determine that a phone appointment is needed 65 and the phone appointment is scheduled 66. Time passes 67 (and the patient does anything they want) until the time for the phone appointment arrives 68. The patient waits for the call from the invention 69 and then talks with the physician 70. The physician disconnects from the patient 71 and the patient receives the billed charges via credit card statement or explanation of benefits (EOB) 72.

Figure 8:
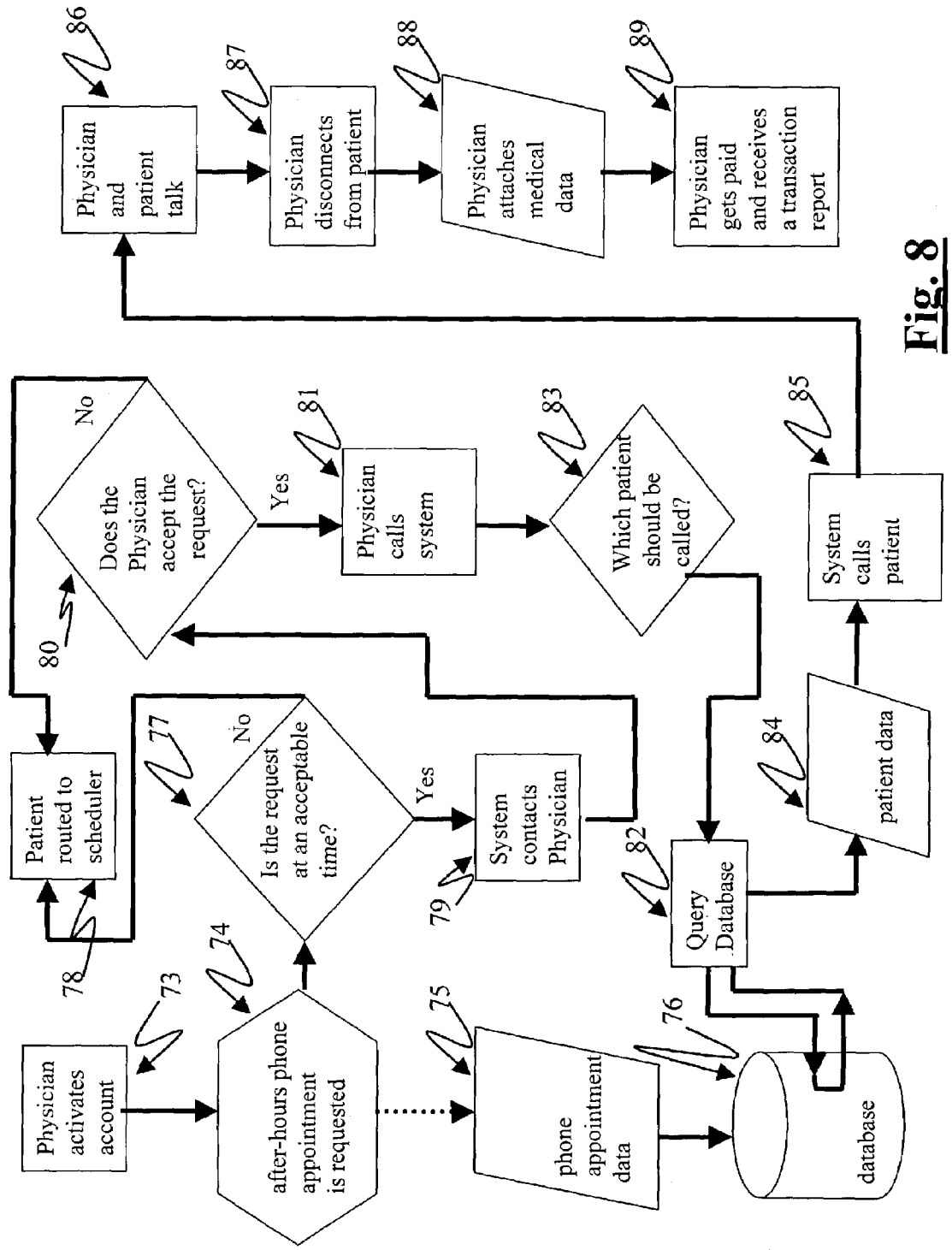
FIG. 8 is an example detailed flow chart showing the functions of an embodiment of the invention from the Physicians viewpoint in the after-hours visit embodiment.

FIG. 8 is a detailed flow chart of an example of an after-hours visit embodiment of the invention from the physician point-of-view. First the physician activates an account 73 (for database tracking and security purposes) in the invention. Next, one of the physician's patients requests an after-hours phone appointment 74 and the data 75 are stored in the database 76. The system determines whether the request is made at an acceptable time (e.g. between 6 pm and 11 pm) 77. If not, the patient is routed to the scheduler 78. If so, the system contacts the physician 79 via the physicians preferred method (e.g. phone, pager or electronic mail). If the physician accepts the request 80, the physician calls the system 81 and the system builds a query 82 to determine which patient should be called 83, retrieves the patient data 84, and calls the patient 85. The physician and patient talk 86, the physician disconnects from the patient 87 and attaches medical data 88 and later receives payment and a report 89.

Figure 9:
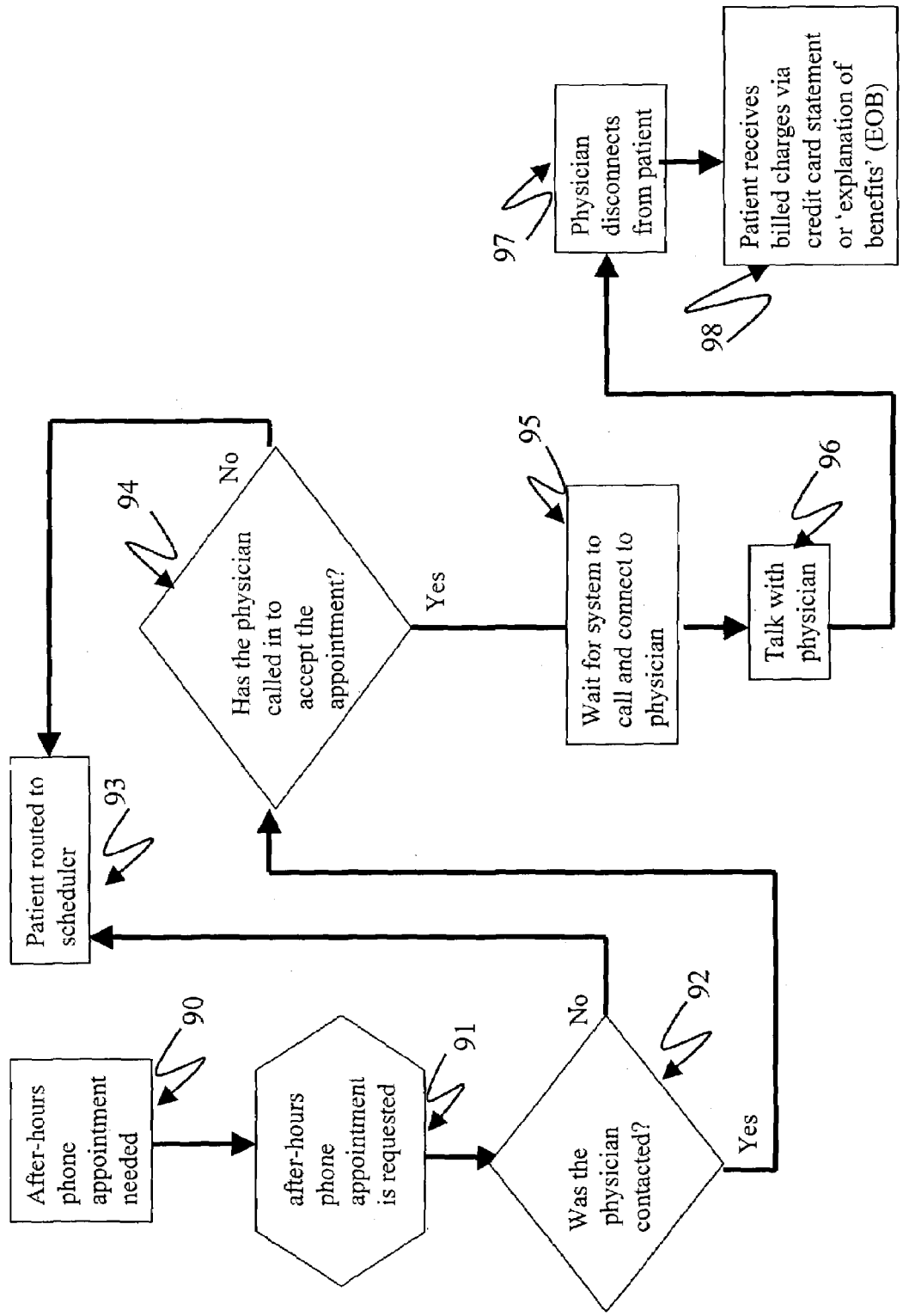
FIG. 9 is an example detailed flow chart showing the functions of an embodiment of the invention from the Patients viewpoint in the after-hours visit embodiment.

FIG. 9 is a detailed flow chart of an example of an after-hours visit embodiment of the invention from the patient point-of-view. First the patient or third-party determines that an after-hours phone appointment is needed 90 and the phone appointment is requested 91. The system determines whether the request is made at an acceptable time (e.g. between 6 pm and 11 pm) and if so, contacts the physician 92. If not, the patient is routed to the scheduler 93 to schedule a future appointment during normal business hours. The physician is contacted via pager, phone, email or other method and the system waits a certain time period for the physician to call in and accept the appointment 94. If the physician does not call after a certain period, the system assumes that the physician declines the appointment request and routes the patient to the scheduler 93. If the physician calls in, the patient is called and the two are connected 95. The physician and patient talk 96 until the physician disconnects from the patient 97 who later receives a bill or an EOB 98.

Figure 10:
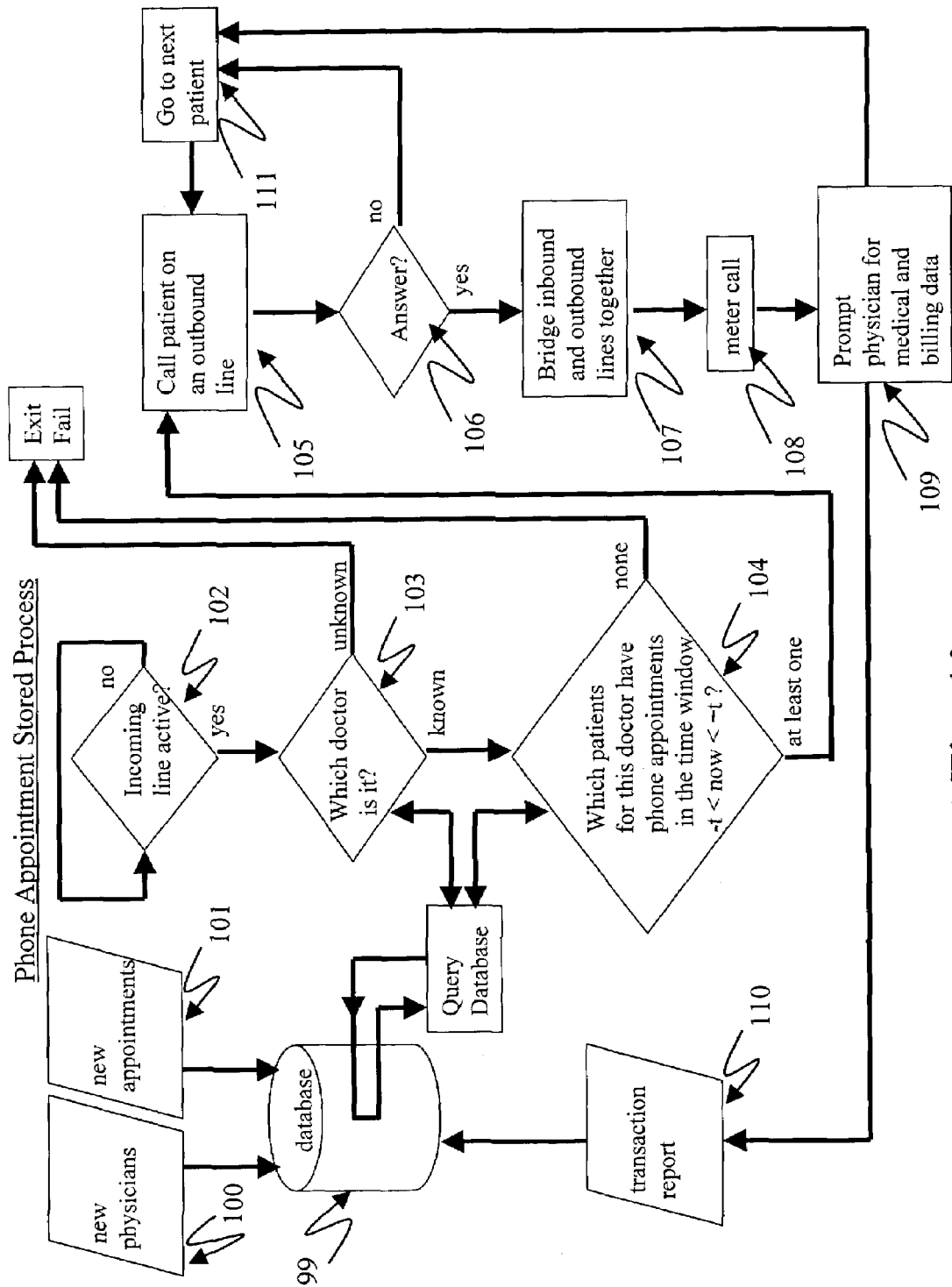
FIG. 10 is an example detailed flow chart showing the functions of an embodiment of the invention from an Administrators viewpoint.

FIG. 10 is a detailed flow chart showing an example embodiment of the invention from the administrator point-of-view. The database 99 receives data for new physicians 100 and new appointments 101. A stored process 102 continually scans the incoming phone lines and determines if any line is active. The system determines if it is a known doctor that is calling 103 and if so determines which if any patients have appointments with this doctor 104 within a specified time window. If at least one patient has an appointment, that patient is called on an outbound line 105. If the call is answered 106 the inbound and outbound lines are bridged together 107. The system meters the call 108 until it's over and then prompts the physician for medical and billing data 109. A transaction report 110 is stored in the database and the physician goes to the next patient 111.

Figure 11:
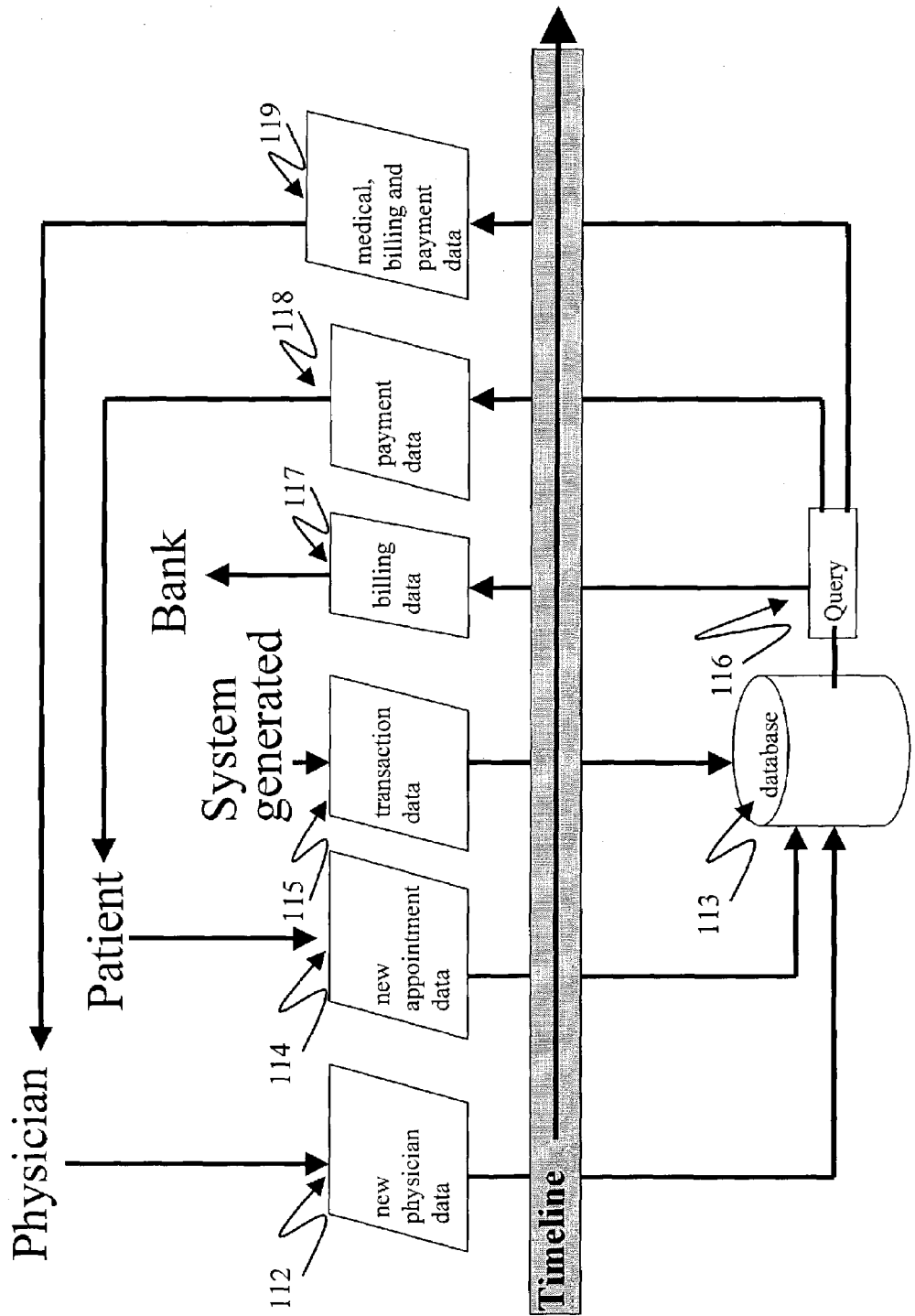
FIG. 11 is an example detailed flow chart showing the flow of telephone appointment data through an embodiment of the invention.

FIG. 11 is a detailed flow chart showing an example of the flow of data from various parties over time. First, when a physician decides to use the system, new physician data 112 is entered into the database 113. Next, appointment data 114 is entered into the database. After an appointment has occurred, transaction data 115 is entered into the database. Periodically, on or more queries 116, generate billing data 117 that is transmitted to a bank, payment data 118 that is transmitted to a patient, or medical, billing and payment data 119 that is transmitted to a physician or other payer. The billing data 117 is then preferably forwarded to the patient from the bank (for example, on a credit card statement).

FIGS. 11–14 are screens used in carrying out processes of database administration, (e.g., database 1), according to the present invention. Each screen shot provides a window into data stored in an example implementation of the appointment system and is applicable to many different embodiments of the present invention.

Figure 12:
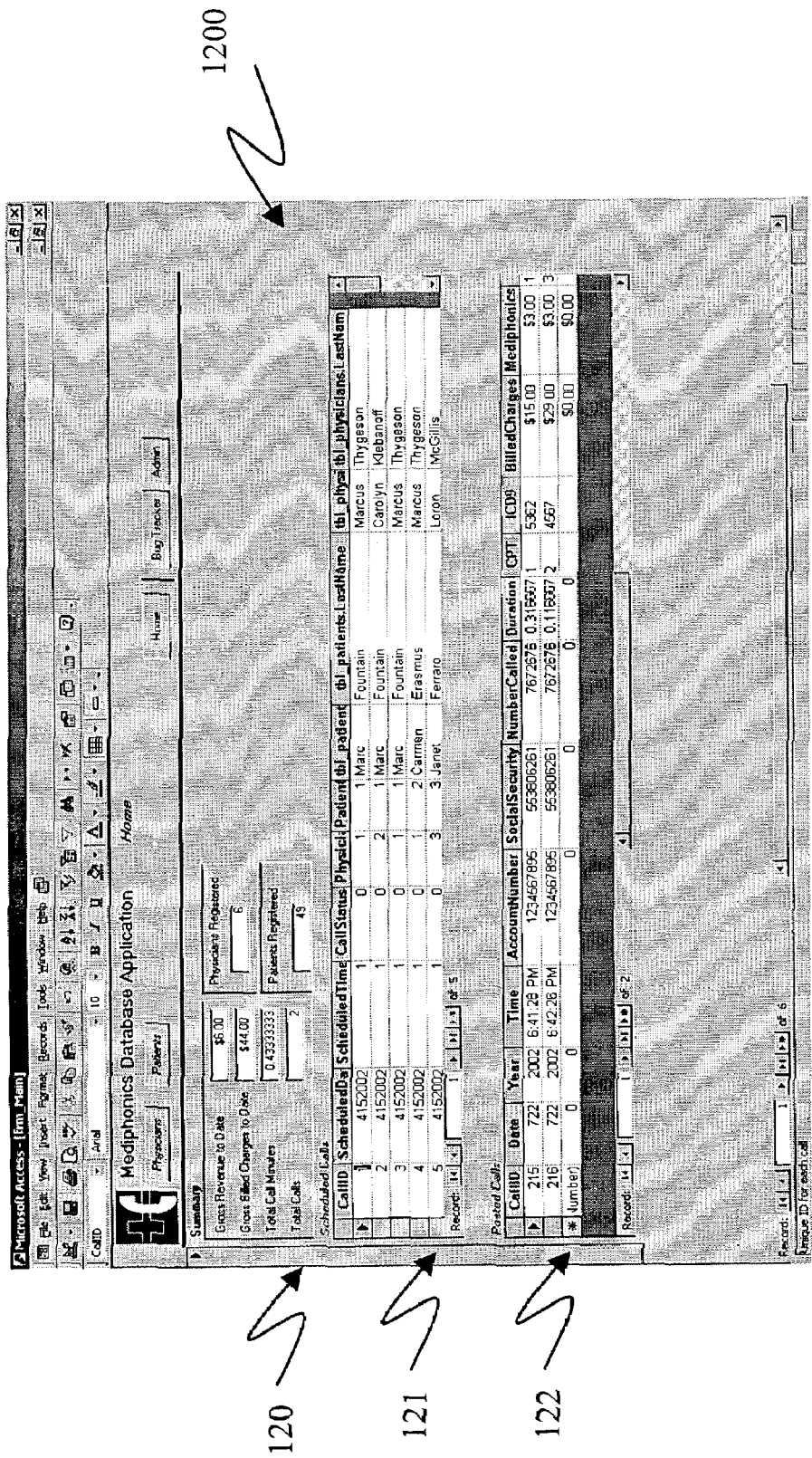
FIG. 12 is a graphic representation of a screen used in carrying out a Main Menu function of database administration according to various embodiments of the invention.

FIG. 12 is a screen shot of an example embodiment of an administrator interface to the database 1200 used to schedule and monitor appointments. The administrator's interface is used in carrying out the process of database administration. The administrator, via the administrator interface, or back office operations, can review appoints made or completed, and review revenue information for physicians using the appointment system.

The administrator's interface to the database 1200 provides a summary 120, which shows the overall statistics for the database. In this example, several physicians are using the telephone appointment system, but some embodiments of the invention provide for single physician usage (e.g., a single office, or stand alone system). A scheduled calls sub-form 121 shows details of the patients and physicians who have upcoming scheduled phone appointments. The details include, for example, an identifier of the scheduled appointment (CallID) 1205, scheduled appointment time 1210, call status 1215, physician id 1220, patient name 1225, and physician name 1230. The posted calls sub-form 122 shows details of the calls that have occurred in the recent past. The details include, for example, an identifier of the call 1230, date 1235, time 1240, account number, patient id (e.g., Social Security number) 1250, a duration of the call 1255, one or more treatment codes, one or more diagnosis codes (e.g., ICD9 codes) 1260, and billing information (e.g., amount charged) 1265. Thus the administrator has access to confirm telephone appointments that are scheduled and completed. In one embodiment, the administrator may also change data in the database as needed (e.g., on a case by case basis).

Figure 13:
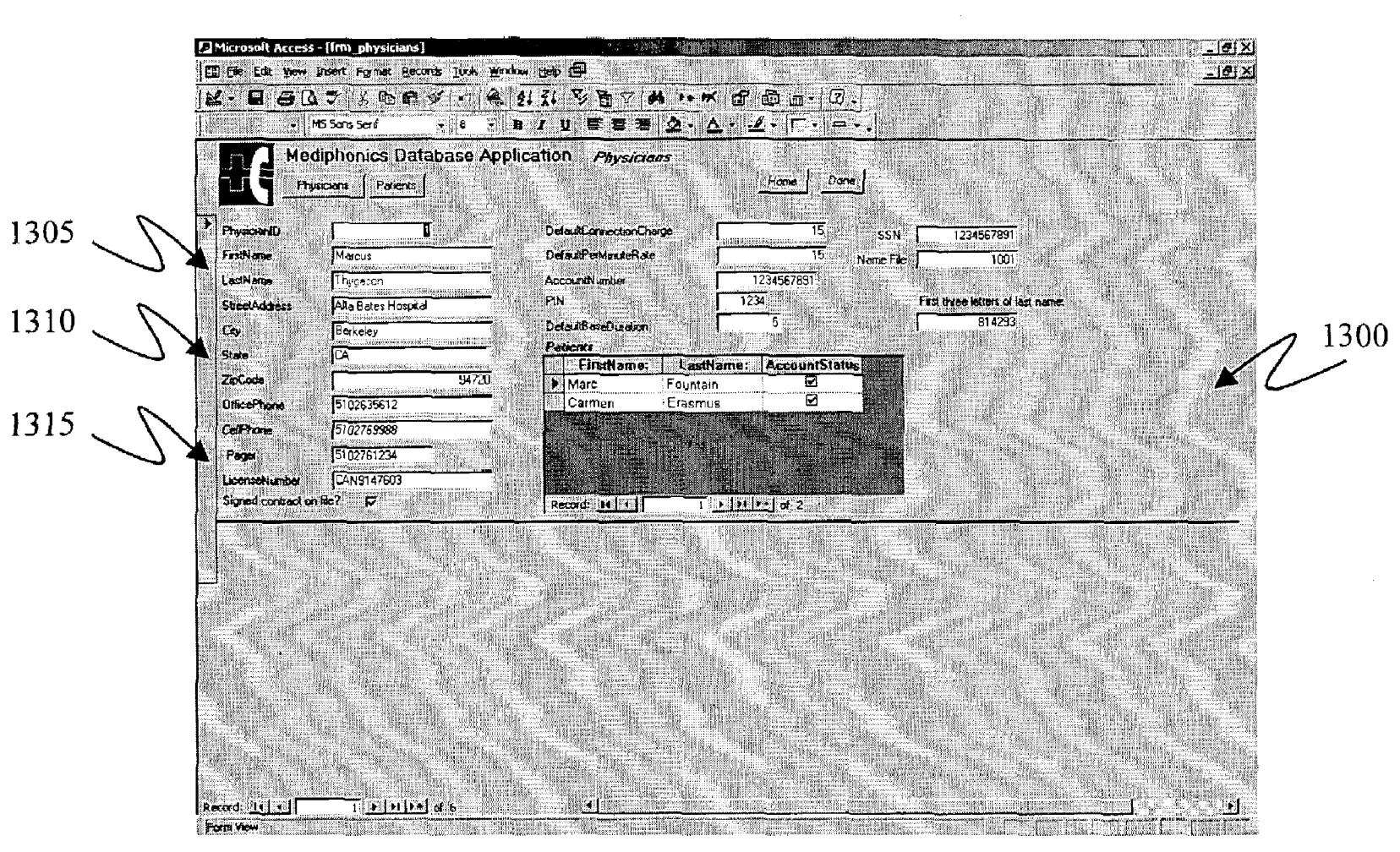

FIG. 13 is a screen shot of an example embodiment of the administrator interface for managing physician data 1300 in the appointment system. Demographic, authentication and pricing data are shown, however, any number of varieties of data may be collected. In this embodiment, the physician information includes name 1305, address 1310, and contact information 1315 (e.g., telephone numbers, pager numbers, instant messaging addresses, etc). Patients 1320 for a selected physician are also listed. Pricing data 1325 includes default charges for the physician. The default charges are, for example, amounts that patients are to be charged unless the physician overrides the default charges (e.g., connection charges and/or charges based on time) by responding to prompts provided by the appointment system (e.g., after the appointment is completed). Preferably, the physician "writes" in the fee for each completed appointment, overriding the default values. Overriding default charges normally occurs after a telephone appointment which the physician feels that a higher or lower fee is justified. In one embodiment, the default charges are linked to treatment, diagnosis, or other codes the physician enters into the system after the telephone appointment (e.g., at step 62, see FIG. 6).

Figure 14:
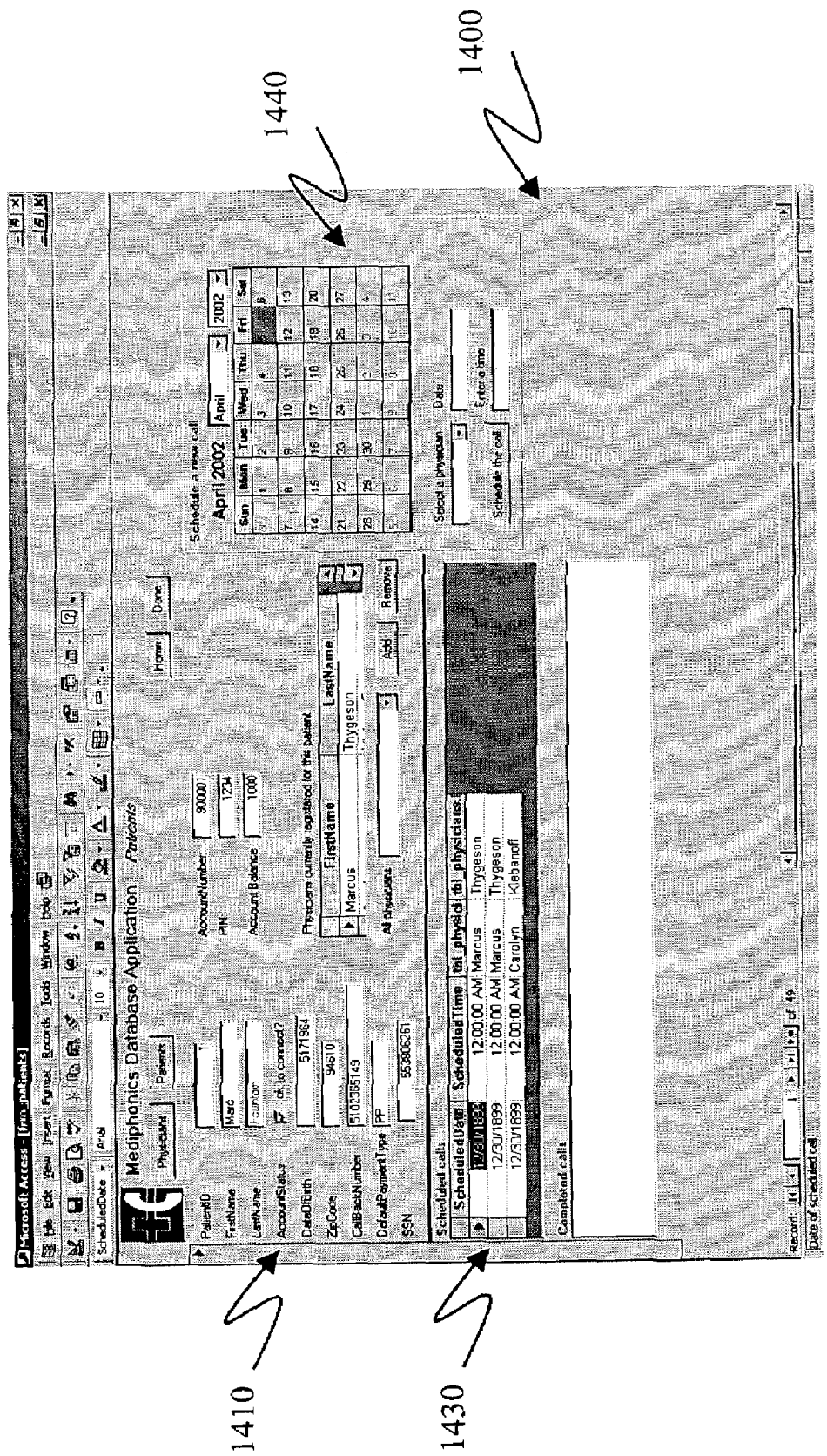
FIG. 14 is a graphic representation of a screen used in carrying out a Patient Accounts Management function of database administration according to various embodiments of the invention.

FIG. 14 is a screen shot showing an embodiment of an administrator interface for managing patient data 1400 in the system. Demographic 1410, authentication 1420, scheduling and call data 1430 are shown. The patients identifying information stored in the database and displayed on the administrator interface includes name, birth date, callback number, id (such as SS#), account number, PIN, and a list of physicians 1415 registered to accept appointments from the patient.

In one embodiment, the patient makes an appointment via a call to a human operator that operates a user interface such as the screen shot in FIG. 14 to make an appointment. A scheduling calendar 1440 facilitates the human operator to quickly enter an appointment in the database by selecting a physician, date, and time, and a calendar to select the date of the appointment. In one embodiment, the call is automatically scheduled to the physician's scheduled appointment block.

Figure 15:
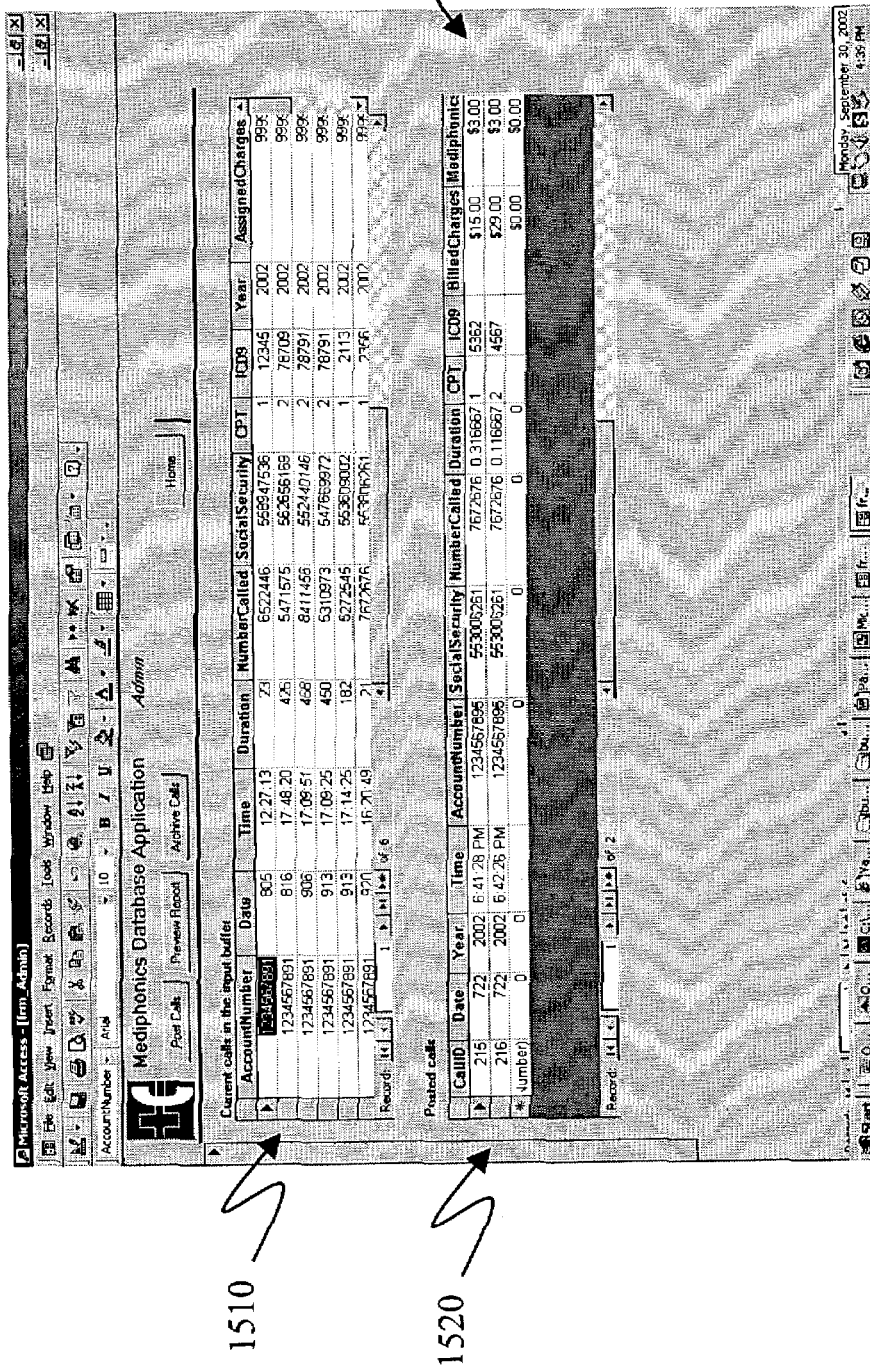
FIG. 15 is a graphic representation of a screen used in carrying out a Call Post-processing function of database administration according to various embodiments of the invention.

FIG. 15 is a screen shot 1500 of an example embodiment of an administrators view of raw call data (before processing) and the posted call data (after fees and codes have been calculated and assigned). The raw call data 1510 is shown above the posted call data 1520. The raw call data 1510 includes information such as account number, date, time, duration, number called, id, treatment and diagnosis codes, and assigned charges (e.g., 9999 being shown as no charges input by the physician which is used to trigger use of the default charges). The posted call data 1520 includes a call ID, date, time, duration, account number, patient id, number called, diagnosis and treatment codes, and charges (billed and appointment service charges—e.g., Mediphonics charges). As noted above, the appointment service may be operated by an individual or a suite of professionals. The appointment service may also be operated by an organization for its members or be commercially provided to individual or otherwise unrelated professionals. Charges for using the appointment system may be made on a percentage, fee per use, subscription, or other basis. The Mediphonics charges in FIG. 15 illustrates a fee per use embodiment (e.g., $3.00 flat fee). Fees for the appointment service may be billed to the participating physician, or included as an itemized charge on the patients bill. Preferably, the appointment system does not bill the physician, unless the physician connects with and charges a patient (e.g., only bills the physician if the physician is also getting paid).

Figure 16:
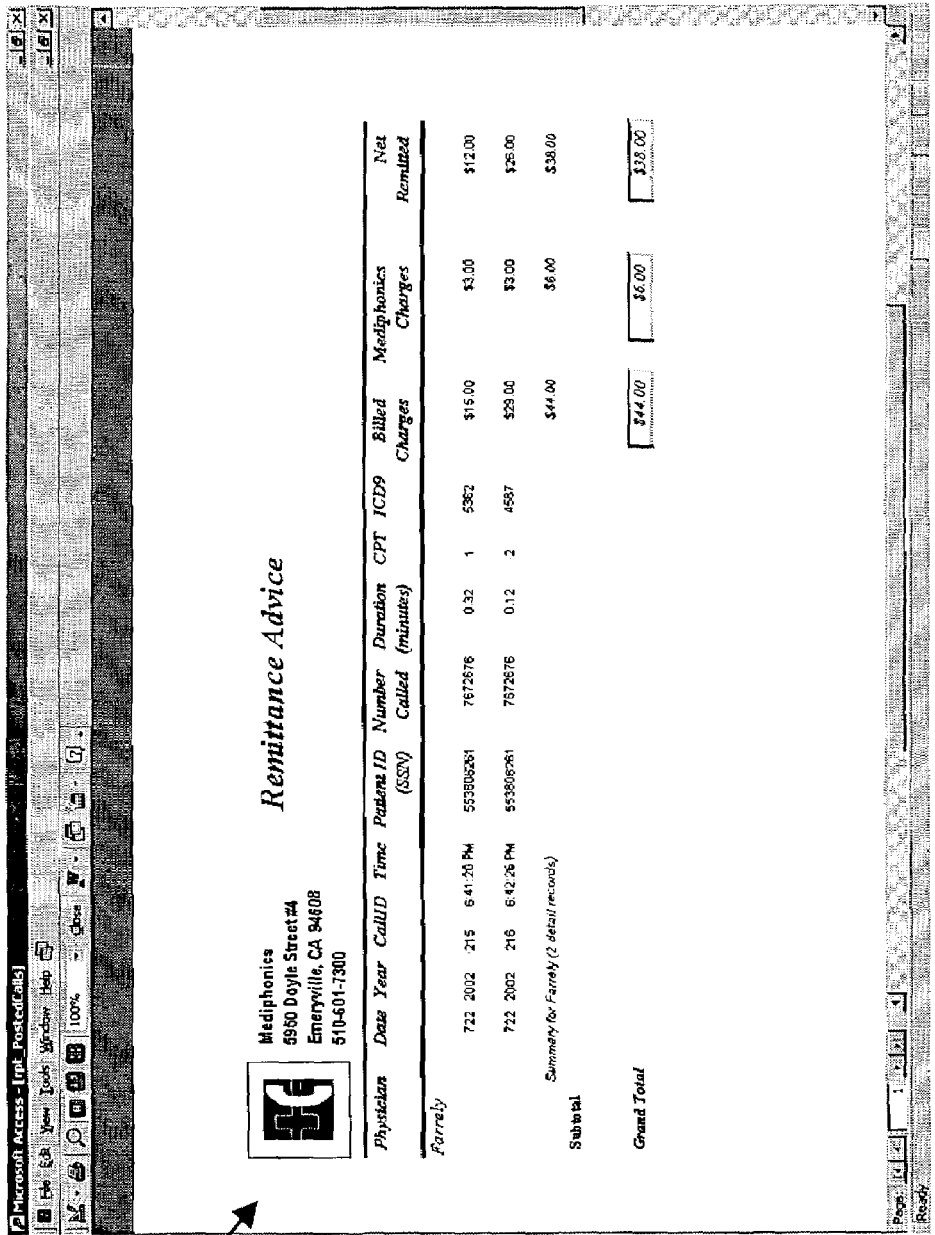
FIG. 16 is a graphic representation of an example reporting mechanism used by an embodiment of the invention to transmit telephone appointment data to a physician (remittance advice).

FIG. 16 is a graphic representation of the reporting mechanism used by the invention to transmit telephone appointment data to physicians (remittance advice 1600). The remittance advice includes a summary of telephone appointments 1610, diagnosis/treatments 1620, and charges 1630. The remittance advise 1600 is entered into the physicians current accounting system like any other Remittance Advice for other matters. In one embodiment, the Remittance Advice 1600 is provided in electronic form and transmitted via e-mail or otherwise communicated to the physician's office, and, in another embodiment, the electronically transmitted remittance advice is in a format that is readable by an accounting system used by the physician so that the data on the remittance advice is automatically entered into the physicians individual accounting system.

In one embodiment, the appointment system is configured so that a physician or other professional may utilize the system to document calls made to persons that have not registered for an appointment. Charges incurred for the telephone calls may be separately charged by the physician, or routed through the billing facilities used for scheduled appointments.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly developed technologies not now known may also be substituted for the described parts and still not depart from the scope of the present invention.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. At least portions of the invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Data used by the software may be retrieved from different sources (local or remote) and either permanently or temporarily stored (before, during, or after any processing) by utilizing any of text files, delimited files, database(s), or other storage techniques. Ultimately, such computer readable media further includes software for performing the present invention, as described above.

Included in the programming (software) of the general/specialized computer or microprocessor are software modules for implementing the teachings of the present invention, including, but not limited to, collecting information from registrants using the appointment system, storing data about appointments, retrieving information about appointments, preparing bills and sending billing information to payment organizations (e.g., billing credit cards), listing appointments for review by a professional, contacting users, contacting professionals, bridging calls between a professional and a user with an appointment, collecting post appointment information (including billing, diagnosis, and treatment, etc) and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method, comprising the steps of:
    assigning at least one user to an appointment with a professional;

establishing, by the professional, with whom the at least one appointment is assigned, a communication between the professional and an appointment system;

establishing a 2nd communication with at least one of the users that have assigned appointments; and bridging the communication with the professional to the 2nd communication to commence an appointment.

2. The method according to claim 1, wherein said step of assigning at least one user to an appointment comprises retrieving information about the appointment comprising at least one of an id of the patient, an id of the professional, and information about the appointment.

3. The method according to claim 1, further comprising the step of registering the user.

4. The method according to claim 1, further comprising the step of:

prioritizing each user having an appointment with the professional during a time period in which the communications with the professional is established;

wherein:

said step of establishing a 2nd communications comprises establishing a 2nd communications with a first available user having a highest priority.

5. The method according to claim 4, further comprising the steps of:

establishing a next communication with a next highest priority user after one of completion of the highest priority user appointment and inability to establish communication with a highest priority user;

bridging the next communication with the communication with the professional; and repeating the steps of establishing a next communication and bridging the next communication until each user has competed an appointment or is unable to establish a communication.

6. The method according to claim 4, wherein:

said step of prioritizing comprises, providing information to the professional regarding at least one user having scheduled an appointment during the time period, and retrieving priority information from the professional.

7. The method according to claim 4, wherein said step of prioritizing comprises notifying the professional of details of appointments scheduled for the time period.

8. The method according to claim 1, further comprising the steps of:

receiving a communication during the bridged communications from a second user scheduled for an appointment;

placing the second user on hold until after the bridged communications is completed; and bridging the communication from the second user to the communication with the professional.

9. The method according to claim 1, wherein:

said steps of establishing a 2nd communication and bridging comprises, establishing an individual 2nd communication with each user having an appointment during the time period, and bridging the communication with the professional to each user individually to complete each user's scheduled appointment.

10. The method according to claim 1, wherein said professional is a physician, said user is a patient, and said step of establishing a communication with the physician comprises receiving a phone call from the physician during a regularly scheduled telephone appointment time period.

11. The method according to claim 10, wherein the actual time of the appointment is also based upon a priority of the user's appointment.

12. The method according to claim 1, wherein:

if the 2nd communication with said at least one of the users is unable to be established, then, performing the steps of, leaving a message for said at least one of the users indicating a method to contact the professional, and establishing a communication with a next user having an assigned appointment;

wherein said step of bridging comprises bridging the communication with the next user to the communication with the professional.

13. The method according to claim 1, wherein said step of establishing a 2nd communication with at least one of the users comprises establishing a conference call between said at least one user and another party.

14. The method according to claim 1, wherein each user is a patient, the professional is a physician, the communications comprise at least one telephone call, and said appointments are appointments for a conversation with the physician.

15. The method according to claim 1, wherein:

said step of assigning at least one user to an appointment comprises, receiving a phone call from a user, retrieving and storing user information from the user, and placing information identifying the user on a list of appointments for the professional.

16. The method according to claim 15, wherein said user information includes at least one of appointment information and, an appointment number, and a doctor ID.

17. The method according to claim 1, further comprising the step of billing the user for the appointment.

18. The method according to claim 17, wherein said step of billing comprises the step of automatically billing an account of the user.

19. The method according to claim 18, wherein said account is one of an insurance, credit card, banking, checking, and bill paying account.

20. The method according to claim 17, wherein said computer instruction are compiled computer instructions stored as an executable program on said computer readable media.

21. The method according to claim 1, further comprising the steps of:

prompting the professional for at least one of billing and service codes related to the bridged communications; and receiving at least one of billing and service codes from the professional.

22. The method according to claim 21, wherein said codes are decodable to ICD9 codes and CPT codes.

23. The method according to claim 1, wherein:

said method is embodied in a set of computer instructions stored on a computer readable media;

said computer instructions, when loaded into a computer, cause the computer to perform the steps of said method.

24. A method, comprising the steps of:

assigning at least one user to an appointment with a professional;

establishing a communication with the professional;

establishing a 2nd communication with at least one of the users that have assigned appointments; and bridging the communication with the professional to the 2nd communication to commence an appointment;

prioritizing each user having an appointment with the professional during a time period in which the communication with the professional is established;
wherein:
said steps of establishing a 2nd communication and bridging comprises,
establishing an individual 2nd communication with each user having an appointment during the time period, and
bridging the communication with the communication with the professional to each user individually to complete each user's scheduled appointment in turn according to the user's priority.

25. The method according to claim 24, wherein:
if a user is unavailable to establish the 2nd communications, the unavailable user is at least one of skipped and assigned an alternate priority; and
said step of establishing a communications with the professional comprises receiving a phone call from the professional at a time proximate in time to a scheduled appointment time, but not exactly at the scheduled appointment time, thereby shifting the actual time of the appointment to before or after the scheduled appointment time.

26. An appointment processing system, comprising:
a scheduling device configured to save appointment times for users contacting the scheduling device;
a communications server configured to receive an incoming communications from a professional, and establish outgoing communications to at least one user having an appointment and place each established outgoing communication on hold; and
a bridging mechanism configured to bridge the professional to at least one of the users on hold.

27. The appointment processing system according to claim 26, further comprising:
a billing module configured to bill each of the users that complete appointments with the professional.

28. The appointment processing system according to claim 27, wherein said billing module further comprises a prompting device configured to prompt the professional for billing information, including at least one of charges, service, and diagnostic codes related to at least one of the appointments.

29. The appointment processing system according to claim 28, wherein said billing module is further configured to retrieve billing codes decodable to ICD9 codes and CPT codes.

30. The appointment system according to claim 26, wherein said communications server is further configured to establish communications with at least one other user and place the other users on hold in a virtual waiting room along with any other users on hold, until the bridged communications is completed, and then individually bridging each on hold user to the professional, in turn, based on a user priority.

31. An appointment system, comprising:
a telephone communications mechanism configured to accept incoming calls and make outgoing calls;
a scheduling device coupled to the telephone mechanism and configured to allow a plurality of user's to select appointment times with at least one professional; and
an appointment manager configured to initiate and manage an appointment process between a professional and each user having an appointment with the professional upon receipt of an incoming call from the professional;
wherein the appointment process comprises automatically making outgoing calls to each of the users having an appointment with the professional and then bridging, individually, in turn, according to a priority, each outgoing user call to the incoming call from the professional.

32. The appointment system according to claim 31, wherein:
the appointment manager further comprises a virtual waiting room configured to accept incoming calls from users, place the incoming user call on hold until accepted by the professional, and then bridge the incoming user call to the incoming call from the professional.

33. A method, comprising the steps of:
setting individual appointments for each of a set of users for an appointment with a professional to be held during a scheduled appointment time frame kept by the professional;
initiating a communication with an appointment system by the professional;
establishing a priority, by the professional, for each of the appointments set for the scheduled appointment time frame;
individually initiating individual user communications with each of the set of users in order according to the professional established priority; and
bridging the professional's communication with the appointment system to the first available user's individual communication.

34. The method according to claim 33, wherein the professional established priority is determined by the professional after reviewing medical information.

35. The method according to claim 33, wherein the user and professional have an established doctor-patient relationship.

36. The method according to claim 33, further comprising the steps of:
leaving a message with call back instructions to users that are unavailable after initiating the individual users' communication so that unavailable users can call back to the professional;
establishing a virtual waiting room by the appointment system that places call back users on hold until the professional is available; and
bridging each call back user in turn with the professional.

* * * * *